US012571441B2

(12) United States Patent
Pileggi et al.

(10) Patent No.: US 12,571,441 B2
(45) Date of Patent: Mar. 10, 2026

(54) COMMERCIAL VEHICLE BRAKE ROTOR

(71) Applicant: Consolidated Metco, Inc., Vancouver, WA (US)

(72) Inventors: William Pileggi, Portland, OR (US); Sven Torstveit, Vancouver, WA (US); Ben Hidalgo, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 709 days.

(21) Appl. No.: 17/307,337

(22) Filed: May 4, 2021

(65) Prior Publication Data

US 2021/0348662 A1      Nov. 11, 2021

Related U.S. Application Data

(60) Provisional application No. 63/059,416, filed on Jul. 31, 2020, provisional application No. 63/020,209, filed on May 5, 2020.

(51) Int. Cl.
| | |
|---|---|
| *F16D 65/12* | (2006.01) |
| *B60B 27/00* | (2006.01) |
| *F16D 65/02* | (2006.01) |

(52) U.S. Cl.
CPC ........ *F16D 65/123* (2013.01); *B60B 27/0052* (2013.01); *F16D 65/128* (2013.01); *B60B 2900/513* (2013.01); *F16D 2065/1304* (2013.01); *F16D 2065/1328* (2013.01); *F16D 2065/1384* (2013.01)

(58) Field of Classification Search
CPC ..... F16D 2065/1304; F16D 2065/1384; B60B 2900/513
See application file for complete search history.

(56) References Cited

U.S. PATENT DOCUMENTS

| | | |
|---|---|---|
| 2,616,230 A | 11/1952 | Hough |
| 2,800,982 A | 7/1957 | Cottrell |
| | (Continued) | |

FOREIGN PATENT DOCUMENTS

| | | |
|---|---|---|
| CN | 1415056 A | 4/2003 |
| CN | 1793037 A | 6/2006 |
| | (Continued) | |

OTHER PUBLICATIONS

Air Disc Brakes Catalog 08; Midwest Wheel Companies, www.midwestwheel.com; Jan. 21, 2021; 28 pages.
(Continued)

*Primary Examiner* — Melody M Burch
(74) *Attorney, Agent, or Firm* — Fitch, Even, Tabin & Flannery LLP

(57) ABSTRACT

In one aspect of the present disclosure, a commercial vehicle brake rotor is provided that includes a unitary, one-piece annular body having a central axis of rotation. The annular body includes vents and a braking portion having inboard and outboard braking surfaces. The annular body includes a central mounting flange having through openings to receive studs of a wheel hub. The through openings each have at least a portion thereof extending axially intermediate the inboard and outboard braking surfaces of the annular body. The annular body further includes inboard and outboard air inlets in communication with the vents.

42 Claims, 22 Drawing Sheets

(56) References Cited

U.S. PATENT DOCUMENTS

| | | | |
|---|---|---|---|
| 3,655,210 | A | 4/1972 | Farnam |
| 3,837,657 | A | 9/1974 | Farnam |
| 3,863,936 | A | 2/1975 | Farnam |
| 4,421,197 | A | 12/1983 | Chandioux |
| 4,564,242 | A | 1/1986 | Krude |
| 4,651,851 | A | 3/1987 | Latvala |
| 4,796,728 | A | 1/1989 | Kanengieter |
| 4,911,972 | A | 3/1990 | Mercuri |
| 4,961,991 | A | 10/1990 | Howard |
| 5,407,032 | A | 4/1995 | Gaudefroy |
| 5,544,726 | A | 8/1996 | Topouzian |
| 5,634,535 | A | 6/1997 | Fennell |
| 6,098,764 | A | 8/2000 | Wirth |
| 6,149,244 | A | 11/2000 | Wagner |
| 6,354,409 | B1 | 3/2002 | Ballinger |
| 6,357,557 | B1 | 3/2002 | Di Ponio |
| 6,446,765 | B1 | 9/2002 | Dabertrand |
| 6,619,440 | B2 | 9/2003 | Antony |
| 6,910,556 | B1 | 6/2005 | Baumgartner |
| 6,978,866 | B2 | 12/2005 | Niebling |
| 7,163,091 | B2 | 1/2007 | Shamine |
| 7,219,778 | B2 | 5/2007 | Pete |
| 7,223,464 | B2 | 5/2007 | Hanzawa |
| 7,261,846 | B2 | 8/2007 | Bauer |
| 7,487,862 | B2 | 2/2009 | Carlson |
| 7,677,368 | B2 | 3/2010 | Tedesco |
| 7,780,243 | B2 | 8/2010 | Lippis |
| 7,934,777 | B1 | 5/2011 | Yuhas |
| 7,980,367 | B2 | 7/2011 | Hester |
| 8,061,785 | B2 | 11/2011 | Ilg |
| 8,584,815 | B2 | 11/2013 | Hester |
| 8,613,347 | B2 | 12/2013 | Pahle |
| 9,469,048 | B2 | 10/2016 | Ungerank |
| 9,759,281 | B1 | 9/2017 | Stratton |
| 9,776,241 | B2 | 10/2017 | Huang |
| 9,964,164 | B1 | 5/2018 | Edwards |
| D833,348 | S | 11/2018 | Hammer |
| 10,267,370 | B2 | 4/2019 | Hammer |
| 10,495,162 | B2 | 12/2019 | Burris |
| 10,527,115 | B2 | 1/2020 | Edwards |
| 10,724,592 | B2 | 7/2020 | Torstveit |
| 2001/0052725 | A1 | 12/2001 | Koschinat |
| 2002/0104721 | A1 | 8/2002 | Schaus |
| 2002/0166738 | A1* | 11/2002 | Gavin ..................... F16D 65/12 |
| | | | 188/71.6 |
| 2003/0094849 | A1 | 5/2003 | Joki |
| 2004/0040803 | A1 | 3/2004 | Debus |
| 2004/0226786 | A1 | 11/2004 | Shamine |
| 2005/0269173 | A1 | 12/2005 | Tedesco |
| 2006/0175160 | A1 | 8/2006 | Weiss |
| 2006/0272906 | A1 | 12/2006 | Gonska |
| 2007/0051571 | A1 | 3/2007 | Carlson |
| 2007/0187907 | A1 | 8/2007 | Potier |
| 2007/0199778 | A1 | 8/2007 | Lee |
| 2009/0218878 | A1 | 9/2009 | Lippis |
| 2009/0298993 | A1 | 12/2009 | Kosinski |
| 2011/0024244 | A1 | 2/2011 | Roehling |
| 2011/0062772 | A1 | 3/2011 | White |
| 2011/0240422 | A1 | 10/2011 | Lathwesen |
| 2011/0278802 | A1 | 11/2011 | Nitsche |
| 2012/0247881 | A1 | 10/2012 | Root |
| 2012/0263935 | A1 | 10/2012 | Ledford |
| 2013/0171391 | A1 | 7/2013 | Tilford |
| 2013/0260150 | A1 | 10/2013 | Grivei |
| 2016/0025165 | A1 | 1/2016 | Plantan |
| 2016/0222908 | A1 | 8/2016 | Martin |
| 2016/0289126 | A1 | 10/2016 | Kitami |
| 2017/0002878 | A1 | 1/2017 | Burgoon |
| 2017/0227077 | A1 | 8/2017 | Hammer |
| 2018/0230901 | A1 | 8/2018 | Tominaga |
| 2018/0306261 | A1* | 10/2018 | Torstveit ................ F16D 65/84 |
| 2019/0003540 | A1 | 1/2019 | Paul |
| 2019/0120312 | A1* | 4/2019 | White ..................... B60T 8/329 |
| 2021/0039434 | A1 | 2/2021 | Moore |

FOREIGN PATENT DOCUMENTS

| | | | | |
|---|---|---|---|---|
| CN | 101155991 | B | 4/2008 | |
| CN | 101524990 | A | 9/2009 | |
| CN | 101743411 | A | 6/2010 | |
| CN | 103161855 | A | 6/2013 | |
| CN | 203147163 | U | 8/2013 | |
| CN | 103453280 | A | 12/2013 | |
| CN | 104154147 | A | 11/2014 | |
| CN | 204383080 | U | 6/2015 | |
| CN | 105102842 | A | 11/2015 | |
| CN | 106151322 | A * | 11/2016 | ........... F16D 65/128 |
| DE | 10145947 | C1 | 11/2002 | |
| DE | 10237504 | A1 | 3/2004 | |
| DE | 102007056748 | A1 | 5/2009 | |
| DE | 102013226333 | A1 * | 6/2015 | ........... F16D 65/123 |
| EP | 0127932 | A1 | 12/1984 | |
| JP | 2008013131 | A | 1/2008 | |
| WO | 02090791 | A1 | 11/2002 | |
| WO | WO-2014033420 | A1 * | 3/2014 | ........... H02K 49/046 |

OTHER PUBLICATIONS

Bendix® Service Data: Bendix® ADB22X™, ADB22X-V™ Air Disc Brakes; Bendix Spicer Foundation Brake LLC; SD-23-7541 BW7308; Aug. 2013; 40 pages.

Bendix® Splined Disc® Hub Rotor Replacement for Bendix® ADB22X™ & ADB22X-V™ Air Disc Brakes Installation Instructions; Bendix Commercial Vehicle Systems LLC; S-1459 Rev. 002; Jul. 2018; 10 pages.

Camel Grinding Wheels 9" 36 Grit Zironia Alumina Cutoff Wheel product item from https://www.mscdirect.com/product/details/ 59536029; publicly available before Apr. 20, 2017; 2 pages.

Discovery Channel's "How It's Made: Grinding Wheels", Season 2, Episode 18, premiered Sep. 20, 2005; transcribed from https://www. youtube.com/watch?v=ggMiOYm6fnM; 15 pages.

DiscPlus™ EX225 Air Disc Brake; Maintenance Manual MM-0467; Meritor Heavy Vehicle Systems, LLC; revised Feb. 2013; 50 pages.

Grainger website of Abrasive Cut-Off and Chop Wheels products from https://www.grainger.com/category/abrasives/cut-off-and-grinding-wheels/abrasive-cut-off-and-chop-wheels; publicly available before Apr. 20, 2017; 10 pages.

International Search Report and Written Opinion from related International Patent Application No. PCT/US2020/044384 dated Dec. 8, 2020; 13 pages.

Invitation to Pay Additional Fees from related International Patent Application No. PCT/US2020/044384 dated Oct. 1, 2020; 2 pages.

Norton 10" 46 Grit Aluminum Oxide Cutoff Wheel product item from https://www.mscdirect.com/product/details/01351006; publicly available before Apr. 20, 2017; 2 pages.

SAF-Holland INTEGRAL™ Disc Brake product brochure from Midwest Wheel website, https://www.midwestwheel.com/index-6. php?ID=08&title=Brakes,%20Brake%20Parts%20and%20Lining; publicly available before Aug. 6, 2019; 2 pages.

Technical Procedure: Trailer Suspension Systems Air Disc Brake (ADB); Hendrickson USA. LLC; Lit No. T71004, Revision E; Oct. 2017; 2 pages.

Extended European Search Report from related European Patent Application No. 20934612.1 dated Apr. 15, 2024; 10 pages.

Canadian Office Action from related Canadian Patent Application No. 3,175,040 dated Aug. 7, 2024; 7 pages.

Communication pursuant to Article 94(3) EPC from related European Patent Application No. 20934612.1 dated Jan. 2, 2025; 8 pages.

First Office Action from related Chinese Patent Application No. 202080098919.2 dated Mar. 6, 2025, with English translation; 22 pages.

Second Office Action from related Chinese Patent Application No. 202080098919.2 dated Sep. 12, 2025, with English translation; 10 pages.

(56)          References Cited

OTHER PUBLICATIONS

First Office Action from related Mexican Patent Application No. MX/a/2022/013443 dated Jul. 31, 2025, with English translation; 16 pages.

\* cited by examiner

COMMERCIAL VEHICLE BRAKE ROTOR

CROSS-REFERENCE TO RELATED APPLICATIONS

This application claims the benefit of U.S. Provisional Patent Application No. 63/020,209, filed May 5, 2020, and U.S. Provisional Patent Application No. 63/059,416, filed Jul. 31, 2020, which are hereby incorporated herein by reference in their entireties.

FIELD

This disclosure relates to brake rotors for commercial vehicles and, more specifically, to vented brake rotors for commercial vehicles.

BACKGROUND

Brake rotors for commercial vehicles are subject to high torque loads and high temperatures during braking operations. Commercial vehicles are typically vehicles having a gross vehicle weight classification between 5 and 8 and equipped with an air or hydraulic brake system. To compensate for the high torque loads, brake rotors for commercial vehicles typically have geometries and materials that permit the brake rotors to have greater rigidity than brake rotors used for passenger vehicles. The brake rotors of commercial vehicles may also be vented to provide airflow through the rotating brake rotor and cool the brake rotor after a braking operation. A vented commercial vehicle brake rotor may be less rigid than similarly sized brake rotor without vents due to the void spaces in the brake rotor required to form the vents. The improvement in heat transfer provided by vents of a commercial vehicle brake rotor for a particular application may therefore be limited by the corresponding reduction in rigidity of the brake rotor. Further, the geometry of vented brake rotors may cause the vented brake rotors to be subject to two types of high temperature-related failures.

The first type of high temperature-related failure is a thermal shock failure wherein the brake rotor experiences a sudden and substantial increase in temperature, such as a brake caliper locking onto the brake rotor and the vehicle continuing to drive. The temperature at the braking surface of the brake rotor may spike beyond normal operating temperatures. Due to the sudden nature of the thermal shock event, the mounting flange of the brake rotor may be at ambient temperature while the braking surface is at an extremely high temperature. The temperature differential between the braking surface and the mounting flange may cause the brake rotor to bend. The bending of the brake rotor may form cracks near bolt holes of the brake rotor mounting flange that propagate outward from the bolt holes.

Another type of high temperature-related failure of commercial vehicle brake rotors is thermal cycling failure wherein the brake rotor repeatedly heats up during a braking operation and cools down after the braking operation. Some prior vented brake rotors have a geometry that causes inboard and outboard sides of the brake rotor to expand and contract at different rates in response to thermal cycling of the brake rotor. The different expansion and contraction rates for the inboard and outboard sides of the brake rotor bends the brake rotor and encourages surface crack propagation along the brake rotor and eventual failure of the brake rotor. The strength required for a commercial vehicle brake rotor and the packaging considerations of the positioning of the brake rotor on a wheel end of a commercial vehicle may make it difficult to address both types of high temperature-related failures that may be experienced by commercial vehicle brake rotors.

SUMMARY

In one aspect of the present disclosure, a commercial vehicle brake rotor is provided that includes a unitary, one-piece annular body having a central axis of rotation. The annular body includes vents and a braking portion having inboard and outboard braking surfaces. The annular body includes a central mounting flange having through openings to receive studs of a wheel hub. The through openings each have at least a portion thereof extending axially intermediate the inboard and outboard braking surfaces of the annular body. The annular body further includes inboard and outboard air inlets in communication with the vents. The brake rotor may provide improved airflow via the inboard and outboard air inlets in a compact package on a wheel hub.

The present disclosure also provides a commercial vehicle brake rotor including an annular body having a central mounting portion, a braking portion radially outward of the central mounting portion, and vents of the braking portion. The annular body includes outboard air inlets that open to the central mounting portion and are in communication with the vents. The mounting portion of the annular body includes inboard bosses, such as ABS tone ring mounting bosses. The annular body further includes inboard air inlets alternating with the inboard bosses about the annular body. The inboard air inlets open to the central mounting portion and are in communication with the vents. In one embodiment, the inboard bosses provide rigidity to the inboard side of the annular body and contribute to limiting the annular body to radial expansion during a braking operation.

In another aspect, a commercial vehicle wheel end assembly is provided that includes a wheel hub and a brake rotor rotatable with the wheel hub. The brake rotor includes an inboard braking surface, an outboard braking surface, and a central mounting portion having a plurality of through openings that receive studs of the wheel hub. At least a portion of each of the through openings extends axially intermediate the inboard and outboard braking surfaces of the brake rotor. The brake rotor further includes vents, inboard air inlets in communication with the vents, and outboard air inlets in communication with the vents. Because at least a portion of each through opening of the mounting portion is axially intermediate the inboard and outboard braking surfaces of the brake rotor, the central mounting portion of the brake rotor may transmit torque during a braking operation to the wheel hub via clamping between nuts and the wheel hub. The clamping occurs within or closely adjacent to a plane defined between the inboard and outboard braking surfaces of the brake rotor. This may increase the robustness of the brake rotor. Further, the inboard air inlets, outboard air inlets, and vents of the brake rotor facilitate cooling of the brake rotor.

DETAILED DESCRIPTION

In one aspect of the present disclosure, a commercial vehicle brake rotor is provided that includes a unitary, one-piece annular body including vents. The annular body includes a central mounting portion, an inboard braking portion, and an outboard braking portion. The annular body includes a plurality of outboard connecting portions connecting the outboard braking portion and the central mounting portion, the outboard connecting portions extending outboard from the central mounting portion to the outboard braking portion. The annular body has inboard air inlets intermediate the outboard connecting portions and the inboard braking portion. The inboard air inlets are in communication with the vents to permit air to flow into the vents from an inboard side of the annular body. The annular body further includes a plurality of inboard connecting portions connecting the inboard braking portion and the central mounting portion, the inboard connecting portions extending inboard from the central mounting portion to the inboard braking portion. The annular body also has outboard air inlets intermediate the inboard connecting portions and the outboard braking portion. The outboard air inlets are in communication with the vents to permit air to flow into the vents from an outboard side of the annular body. The outboard and inboard connecting portions provide symmetry in the thermal expansion and contraction of the annular body so that the annular body is limited to radial expansion and contraction rather than bending. In this manner, the outboard and inboard connecting portions improve the robustness of the commercial vehicle brake rotor by limiting temperature-induced bending of the annular body which in turn limits surface crack propagation along the annular body.

In one embodiment, the outboard and inboard connecting portions alternate about the annular body. The alternating outboard and inboard connecting portions contribute to the rigidity of the annular body. Further, the alternating outboard and inboard connecting portions contribute to symmetrical thermal expansion and contraction of the annular body about a midline of the annular body.

Figure 1:
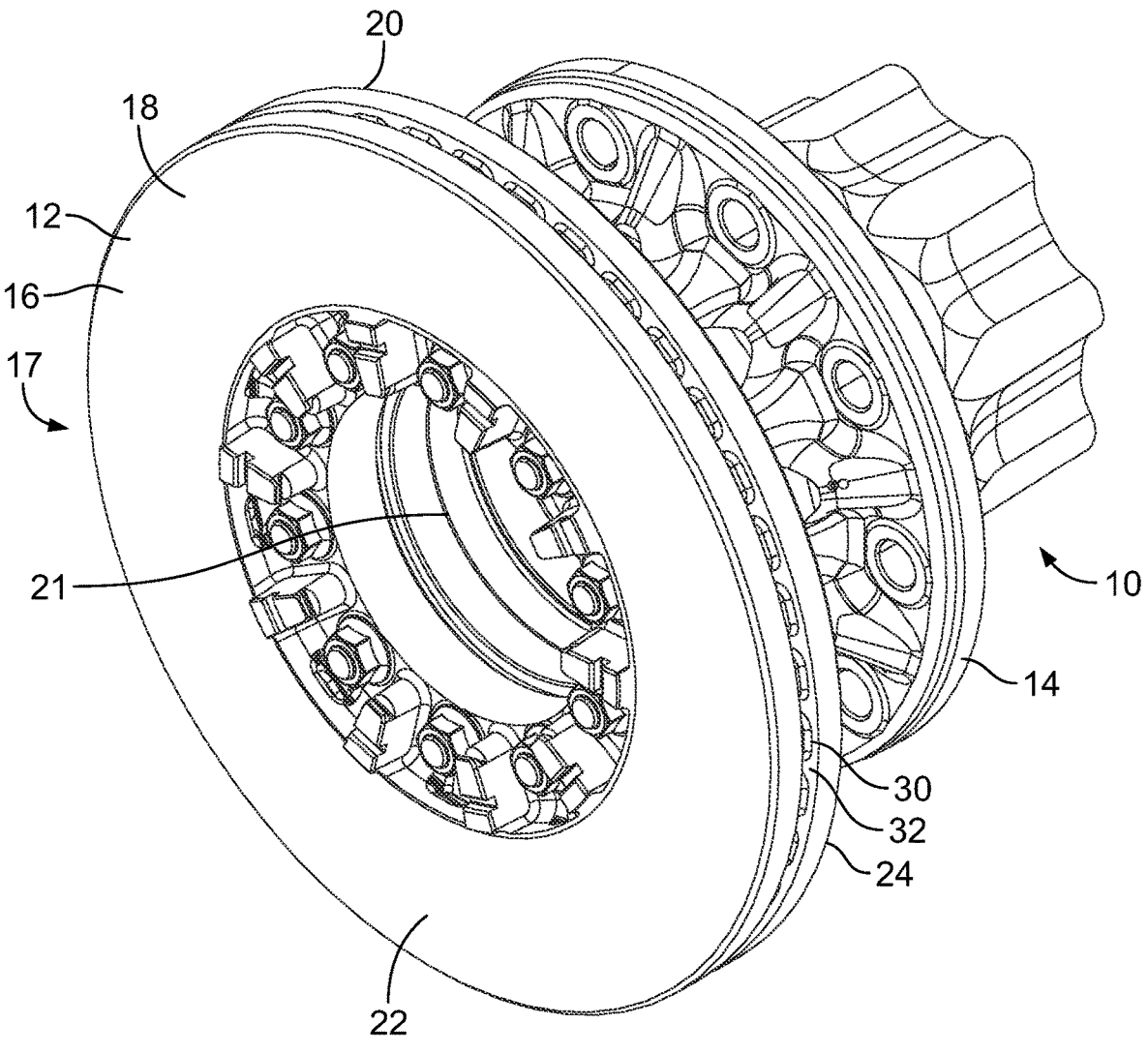
FIG. 1 is a perspective view of a wheel end assembly including a brake rotor and a wheel hub.

Regarding FIG. 1, a wheel end assembly 10 is provided that includes a brake rotor 12 connected to a wheel hub 14. The wheel end assembly 10 has an opening 21 for receiving a vehicle spindle and the wheel end assembly 10 is configured to rotate around the vehicle spindle. The wheel hub 14 may include various components for rotatably securing the wheel end assembly 10 to the vehicle spindle such as bearings, a spacer, and a spindle lock nut which are not shown for clarity purposes. The brake rotor 12 has a body 16 with a braking portion 17 including an inboard braking portion 18 and an outboard braking portion 20. The inboard braking portion has an inboard braking surface 22 and the outboard braking portion 20 has an outboard braking surface 24. The inboard and outboard braking surfaces 22, 24 are frictionally engaged by pads of a brake caliper of the commercial vehicle to slow turning of the wheel end assembly 10. The brake rotor 12 further includes vanes 30 extending between the inboard and outboard braking portions 18, 20 that cooperate with the inboard and outboard braking portions 18, 20 to form vents 32. The vents 32 permit airflow between the inboard and outboard braking portions 18, 20 to cool the brake 12 during and after a braking operation.

Figure 2:
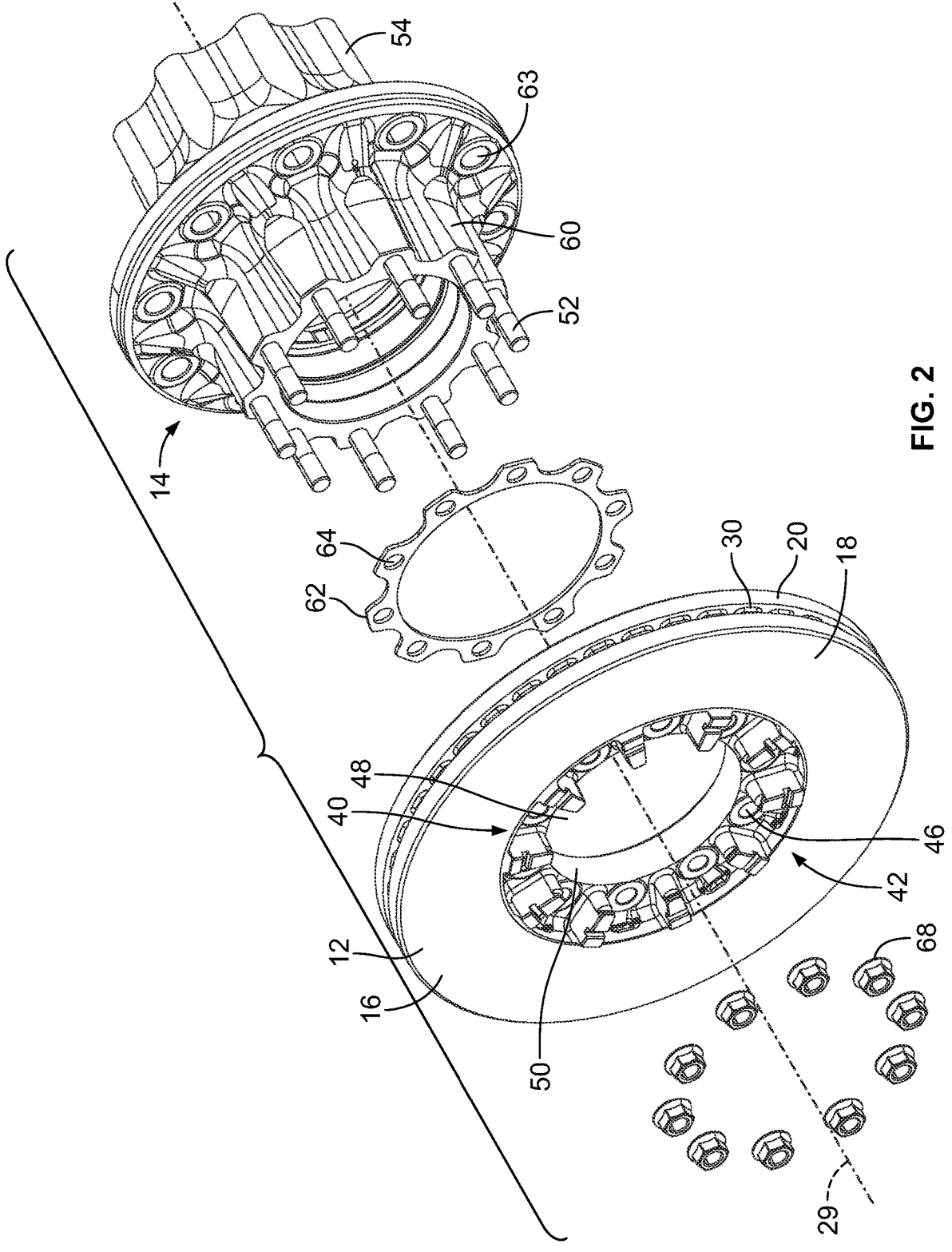
FIG. 2 is an exploded view of the wheel end assembly of FIG. 1 showing a central mounting flange of the brake rotor having through openings that receive studs of the wheel hub.

Regarding FIG. 2, the body 16 of the brake rotor 12 includes a central mounting portion, such as a mounting flange 40, and a transition portion 42 connecting the mounting flange 40 to the inboard and outboard braking portions 18, 20. The mounting flange 40 includes through openings 46 for receiving studs 52 of the wheel hub 14, a central opening 48, and an annular inner surface 50. The wheel hub 14 includes a body 54 supporting the studs 52 and a tubular portion 60. The wheel hub body 54 may also include openings 63 that receive fasteners such as bolts to connect a rim and tire assembly of a wheel.

In some embodiments, the wheel end assembly 10 includes an insulator 62 that resists heat transfer between the brake rotor 12 and the wheel hub 14. The insulator 62 has openings 64 that receive the studs 52 of the wheel hub 14 and is sandwiched between the wheel hub body 54 and the brake rotor mounting flange 40. The wheel end assembly 10 may further include nuts 68 that are threadingly engaged with distal portions of the studs 52 to secure the brake rotor 12 to the wheel hub 14.

Figure 3:
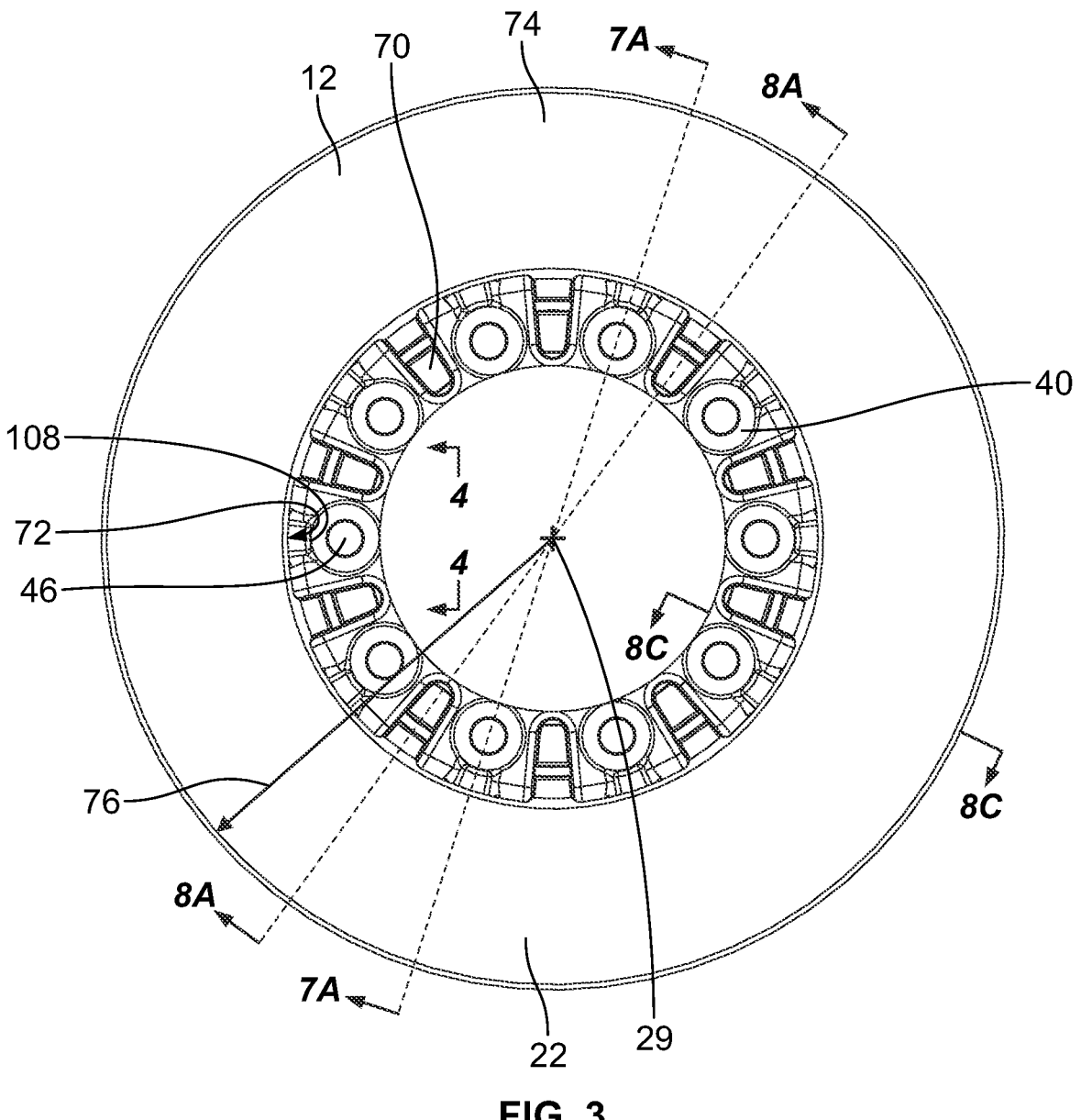
FIG. 3 is a plan view of an inboard side of the brake rotor of FIG. 2 showing the through openings of the brake rotor alternating with ABS tone ring mounting bosses of the brake rotor around the brake rotor.

Regarding FIG. 3, the body 16 has an annular configuration extending about a central axis 29. The mounting flange 40 includes bosses, such as ABS tone ring mounting portions. In one embodiment, the ABS tone ring mounting portions include ABS tone ring mounting bosses 70, that alternate with the through openings 46 around the mounting flange 40. The ABS tone ring mounting bosses 70 include one or more portions for connecting to an ABS tone ring, such as a groove 71 that receives a portion of a tone ring and a pocket 73 that receives a retaining ring. The retaining ring may snap into the pocket 73 and maintains the ABS tone ring secured to the ABS tone ring mounting bosses 70.

The brake rotor 12 includes inboard air inlets 72 that permit airflow to flow from an inboard side 74 of the brake rotor 12 and into the vents 32. The inboard air inlets 72 are outboard of or recessed from the inboard braking surface 22. In one embodiment, the inboard air inlet vents 72 are radially aligned with the through openings 46 of the mounting flange 40. As used herein, the term radially aligned is intended to encompass components that have at least a portion overlapping along a radius (e.g., radius 76) drawn from the central axis 29. Similarly, the term axially aligned is intended to encompass components that have at least a portion overlapping along the central axis 29.

Figure 4:
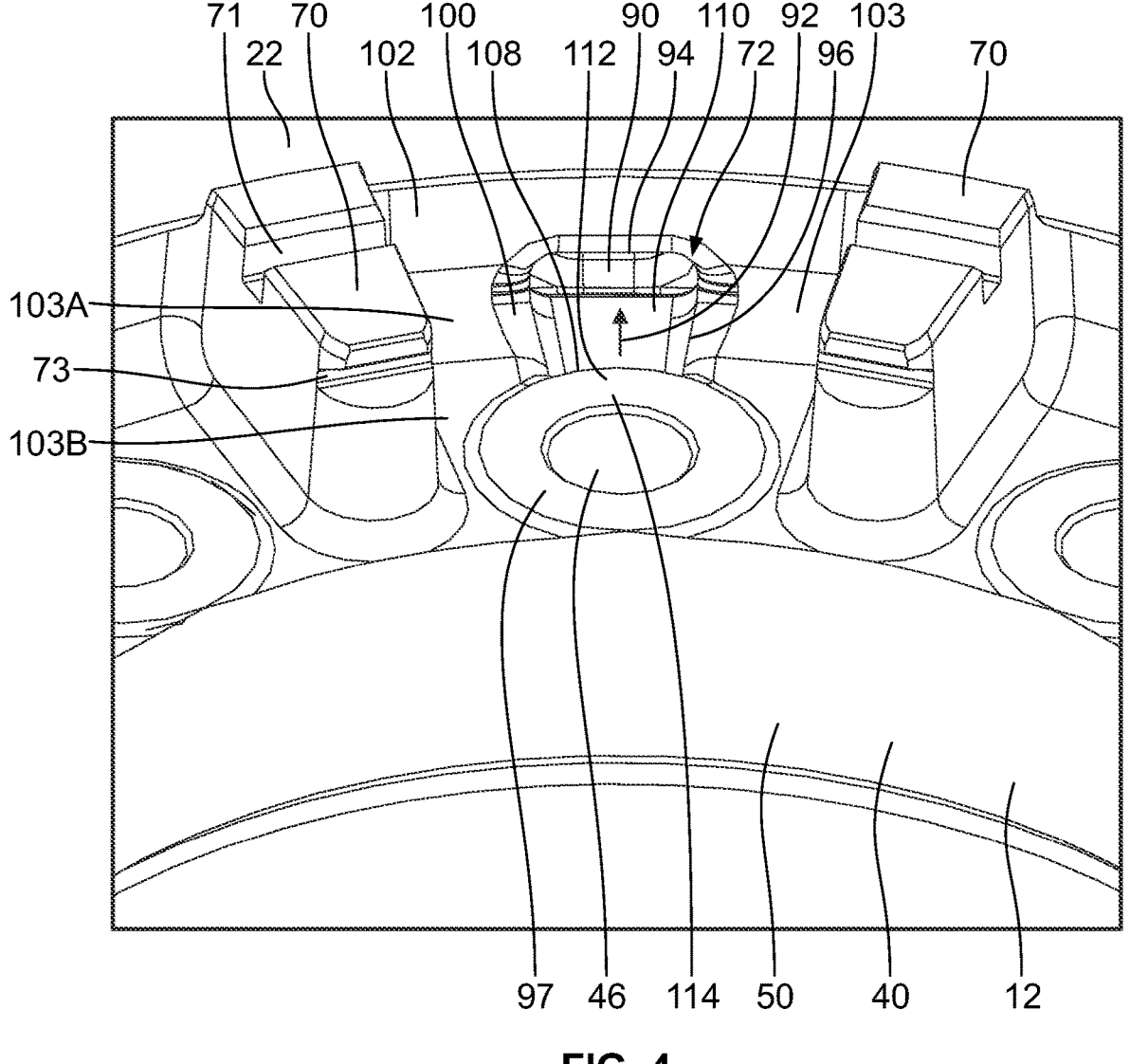
FIG. 4 is a perspective view of a portion of the brake rotor taken generally at line 4-4 in FIG. 3 showing an inboard air inlet of the brake rotor that is in communication with internal vents of the brake rotor.
Figure 12:
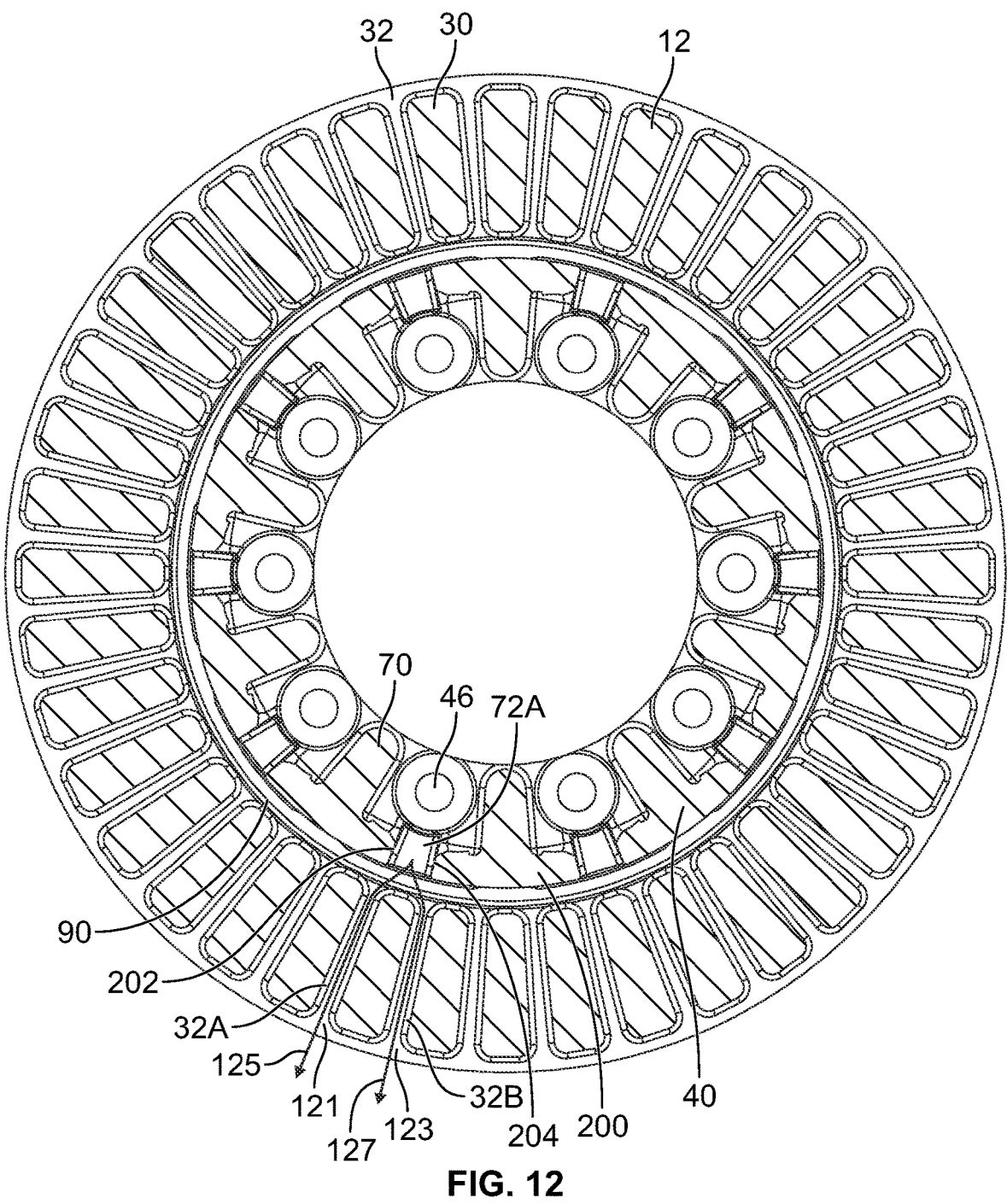
FIG. 12 is a cross-sectional view taken across line 12-12 in FIG. 9 showing airflow paths from one of the inboard air inlets extending radially outward through vents of the brake rotor.

Regarding FIGS. 4 and 12, the brake rotor 12 includes an interior, annular channel 90 intermediate the inboard air inlet 72 and the vents 32. The annular channel 90 operates as a manifold to distribute air from the inboard air inlets 72 and outboard air inlets 120 (see FIG. 5) of the brake rotor 12 to the vents 32. As shown in FIG. 12, during rotation of the brake rotor 12, air may enter the inboard air inlet 72A, travel into the channel 90, into vents 32A, 32B, and through vent outlets 121, 123 along paths 125, 127. The airflow cools the inboard and outboard braking portions 18, 20 of the brake rotor 12 as the airflow travels along the paths 125, 127. The brake rotor 12 may be mounted to rotate in either direction and produce similar airflow through the brake rotor 12.

Regarding FIG. 4, air may enter the inboard air inlet 72 generally in direction 92 and travel into the channel 90. The inboard air inlet 72 includes an opening 94 and may include a groove 96 that leads into the opening 94. The mounting flange 40 includes a nut seat 97 which may include, for example, a flat annular surface against which an outboard surface of one of the nuts 68 may seat against. The inboard air inlet 72 may also include a chamfer 100 about the opening 94 that smooths the transition between a sidewall portion 102 of the inboard braking portion 18 and the opening 94. The groove 96 and chamfer 100 provide a geometry for guiding air into the opening 94 while minimizing stress risers in the brake rotor 12 near the inboard air inlet 72.

Regarding FIGS. 3 and 4, the groove 96 removes material radially outward from the nut seat 96 and forms a step 108 that transitions from the nut seat 97 to a floor surface 110 of the groove 96. The step 108 reduces the thickness of the body 16 radially outward from the nut seat 96. The reduced thickness of the body 16 radially outward from the nut seat 96 creates a low stress portion 112 radially outward from the through opening 46. In the event that a surface crack forms at a surface portion 114, the low stress portion 112 inhibits the stress fracture from propagating radially outward. In this manner, the body air inboard inlet 72 and associated geometry helps improve the robustness of the brake rotor 12.

Regarding FIG. 4, the brake rotor 12 may have radii 103A on opposite sides of each inboard air inlet 72. Each radius 103A connects an inboard surface portion 103B to the sidewall portion 102. There may be a radius 103A on either side of each ABS tone ring mounting boss 70 which contributes to the rigidity of the inboard braking portion 18 relative to the mounting flange 40.

Figure 5:
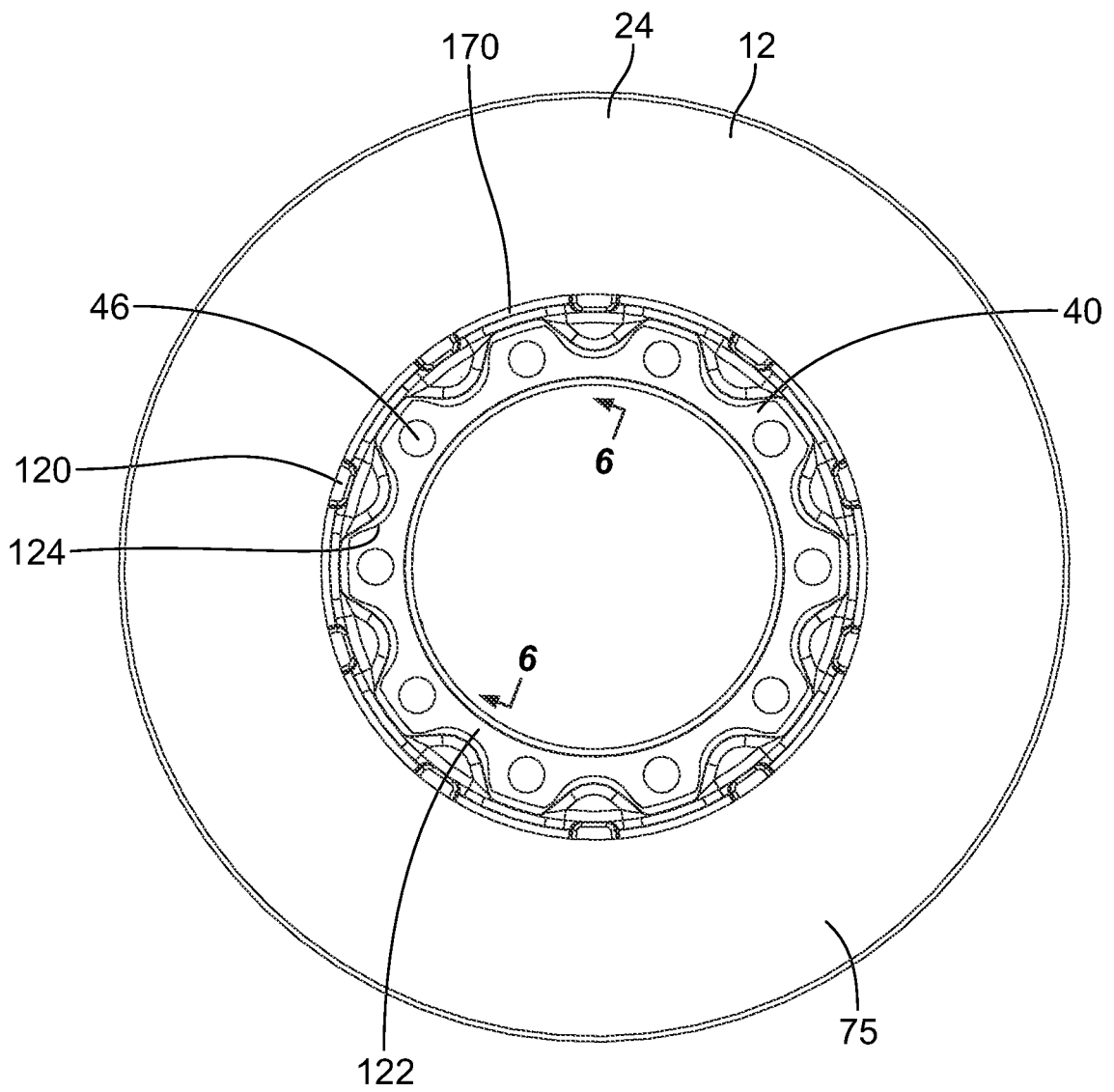
FIG. 5 is a plan view of an outboard side of the brake rotor of FIG. 2.
Figure 6:
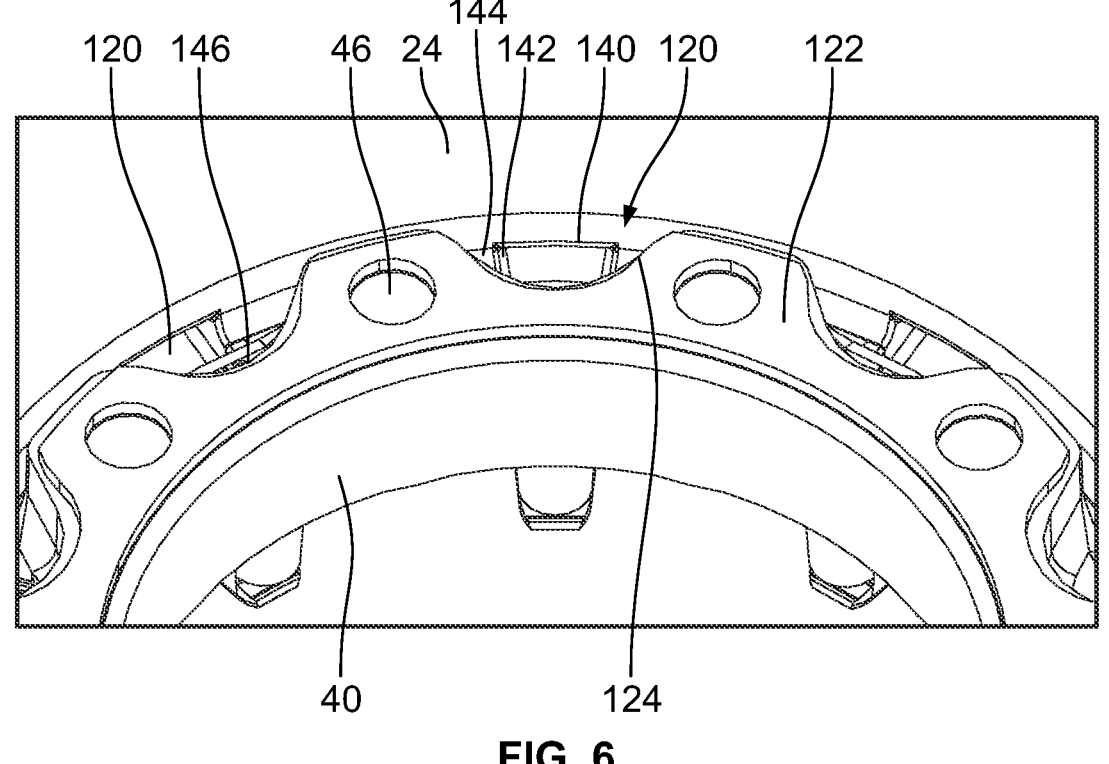
FIG. 6 is a perspective view of a portion of a brake rotor taken generally at line 6-6 in FIG. 5 showing outboard air inlets that are in communication with the vents of the brake rotor and chamfers near the outboard air inlets that permit air flow into the outboard air inlets.

Regarding FIGS. 5 and 6, the outboard air inlets 120 of the brake rotor 12 are shown on the outboard side 75 of the brake rotor 12. The outboard air inlets 120 are inboard of or recessed from outboard braking surface 24. The outboard air inlets 120 include openings 140 and tapered surfaces 142 that transition from a sidewall portion 144 of the brake rotor 12 into the opening 140. The mounting flange 40 includes an outboard surface 122 having a chamfer 124 that permits clearance for airflow to travel around an end of the tubular portion 60 of the wheel hub body 54 and into the outboard air inlet 120. The outboard air inlets 120 may also include floor surfaces 146 that direct airflow traveling along the chamfer 124 into the opening 140.

Figure 10:
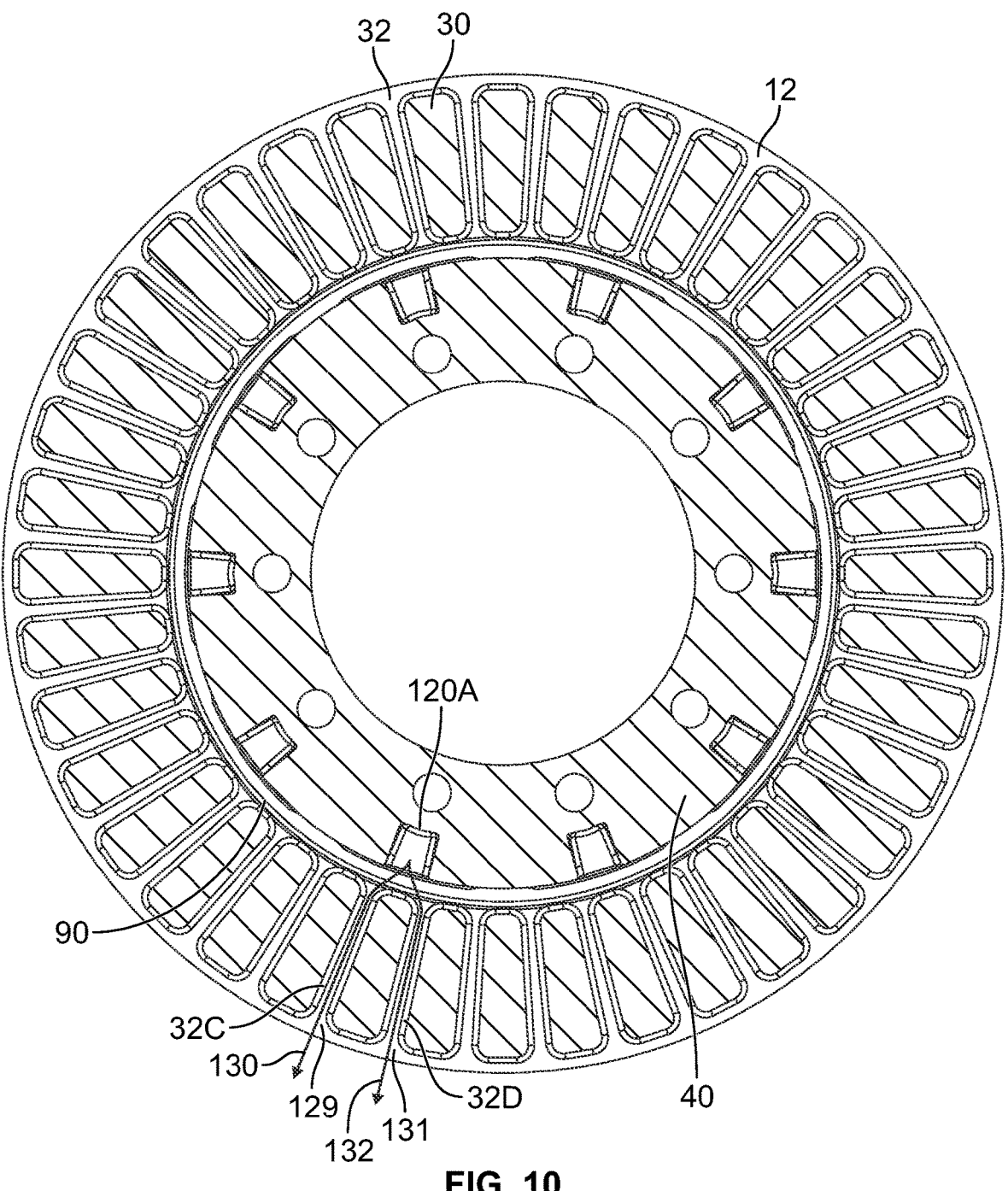
FIG. 10 is a cross-sectional view taken across line 10-10 in FIG. 9 showing airflow paths from one of the outboard air inlets extending radially outward through vents of the brake rotor.

Regarding FIG. 10, during rotation of the brake rotor 12, air may flow into the outboard air inlet 120A, into the channel 90, into vents 32C, 32D, and outward through vent outlets 129, 131 along paths 130, 132. The airflow cools the inboard and outboard braking portions 18, 20 as the airflow travels along the paths 130, 132. The airflow that enters the inboard and outboard air inlets 72, 120 may intermingle in the channel 90 and the vents 32 and provide a more even airflow temperature within the brake rotor 12. The more even airflow temperature within the brake rotor 12 may limit localized high-temperature areas within the brake rotor 12 during braking operations.

Figure 7A:
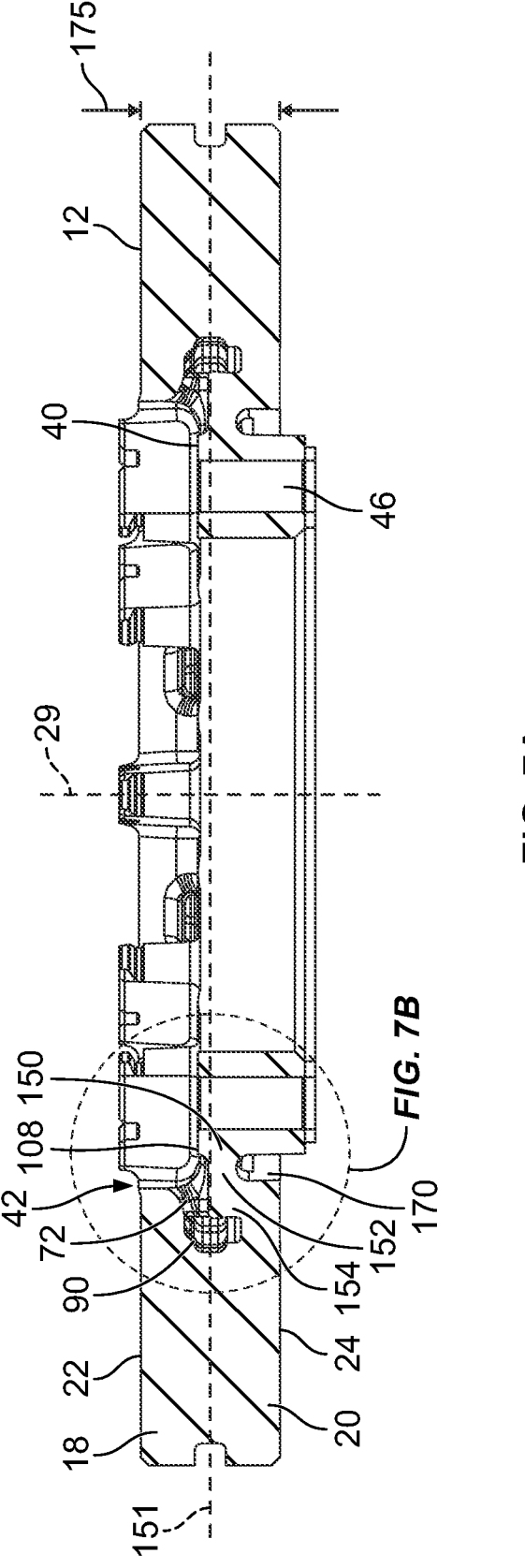
FIG. 7A is a cross-sectional view taken across line 7A-7A in FIG. 3 showing outboard connecting portions of the brake rotor connecting the mounting flange to an outboard braking portion of the brake rotor.
Figure 7B:
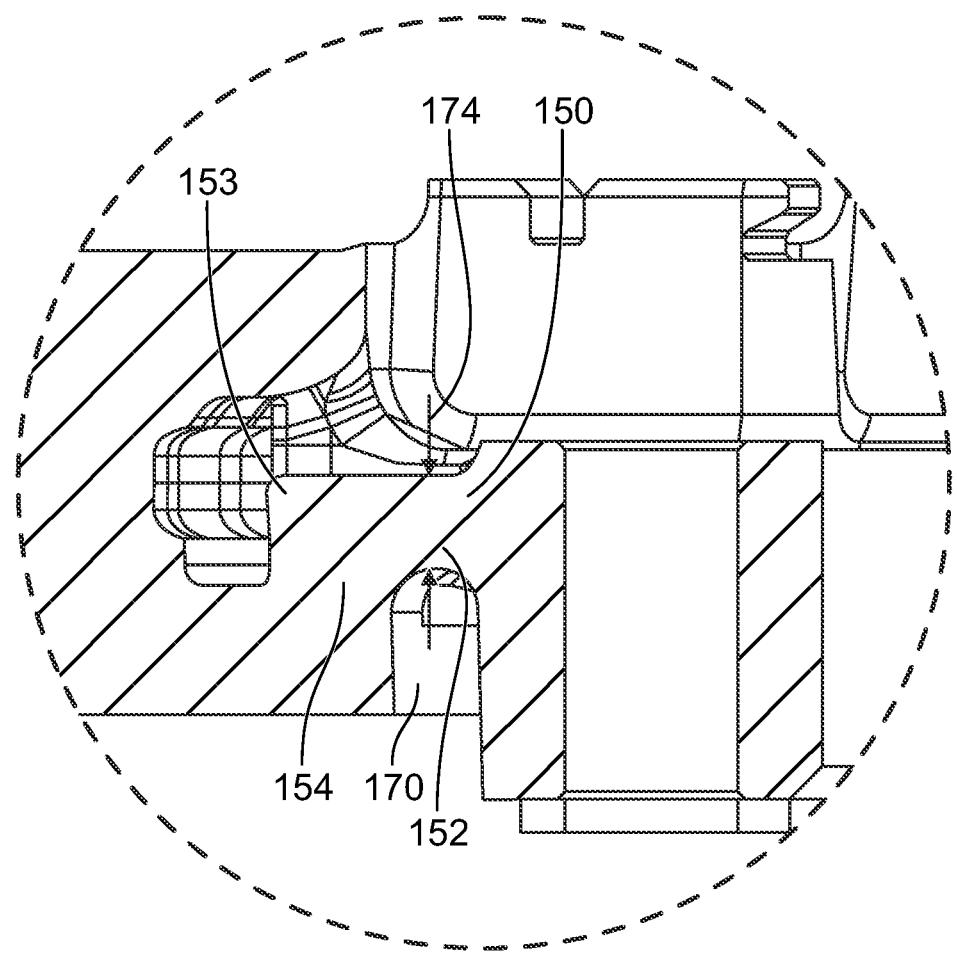
FIG. 7B is an enlarged view of the area shown in the dashed circle of FIG. 7A.

Regarding FIGS. 7A and 7B, the transition portion 42 of the brake rotor 12 includes an outboard connecting portion 150 connecting the mounting flange 40 to the outboard braking portion 20. The outboard connecting portion 150 intersects or is in proximity to a centerline or midline 151 of the brake rotor 12. In one embodiment, the outboard connecting portion 150 has a first portion, such as a radial portion 152 extending radially along the midline 151. The outboard connecting portion 150 further includes a second portion, such as a transverse portion 154 extending in an outboard direction along the central axis 29. The outboard connecting portion 150 includes an elbow portion 153 connecting the radial portion 152 and the transverse portion 154.

Figure 8A:
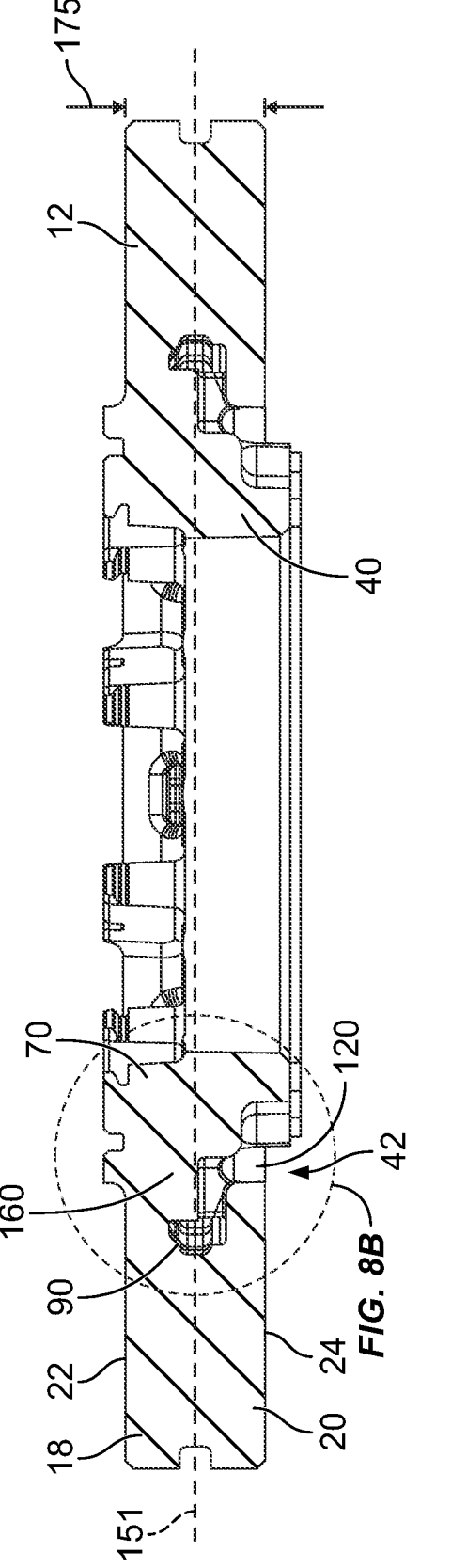
FIG. 8A is a cross-sectional view taken across line 8A-8A in FIG. 3 showing inboard connecting portions of the brake rotor connecting the mounting flange to an inboard braking portion of the brake rotor.
Figure 8B:
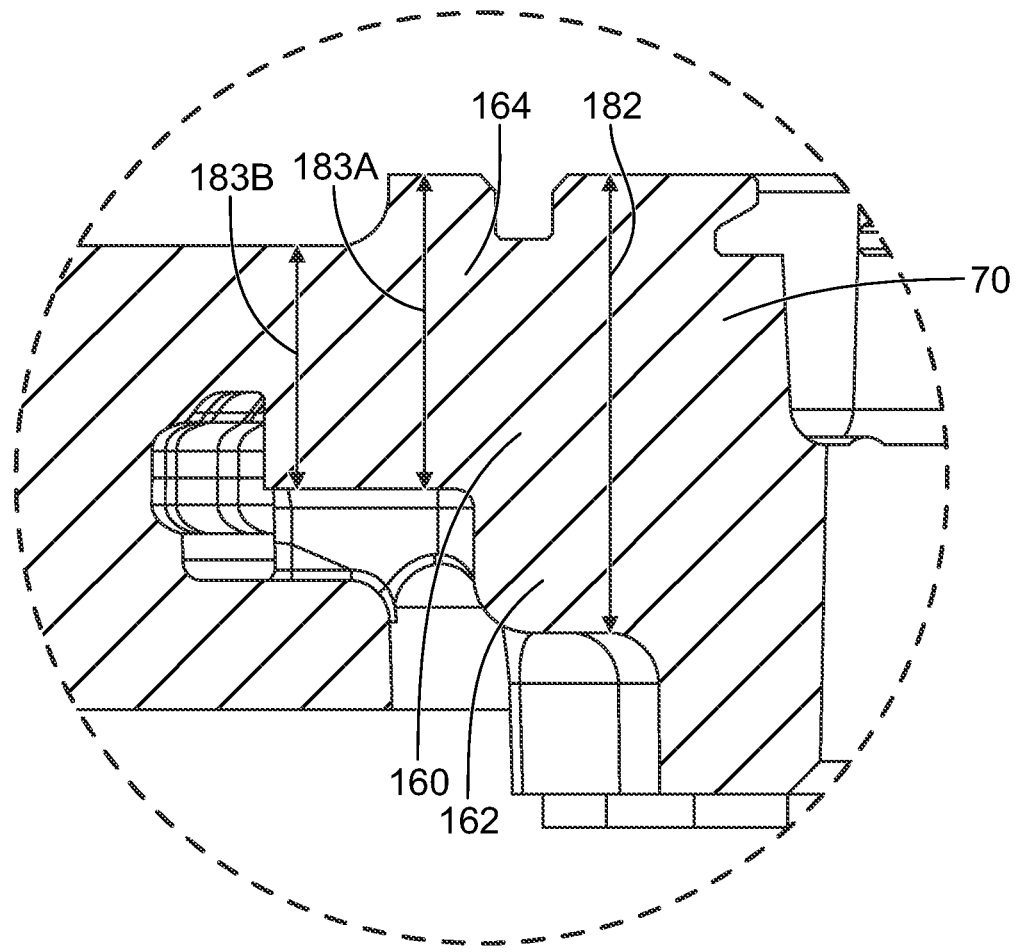
FIG. 8B is an enlarged view of the area shown in the dashed circle of FIG. 8B.

Regarding FIGS. 8A and 8B, the transition portion 42 of the brake rotor 12 also includes an inboard connecting portion 160 connecting the mounting flange 40 to the inboard braking portion 18. The inboard connecting portion 160 intersects or in proximity to the midline 151. The inboard connecting portion 160 has a first portion such as a radial portion 162 including one of the ABS tone ring mounting bosses 70 and having a thickness 182. The inboard connecting portion 160 may further include a second portion such as a thinner radial portion 164 having thicknesses 183A, 183B.

The brake rotor 12 has outboard connecting portions 150 and inboard connecting portions 160 in an alternating arrangement around the brake rotor 12. The alternating outboard and inboard connecting portions 150, 160 provide a rigid construct to connect the inboard and outboard braking portions 18, 20 to the mounting flange 40. The alternating inboard and outboard connecting portions 150, 160 contribute to the brake rotor 12 being able to handle the high loads experienced by brake rotors of commercial vehicles.

Further, the alternating outboard and inboard connecting portions 150, 160 expand and contract at substantially similar rates such that the brake rotor 12 expands and contracts in the radial direction generally along the midline 151 rather than the inboard and outboard braking portions 18, 20 bending. Further, the alternating outboard and inboard connecting portions 150, 160 permits the expansion and contraction of each outboard connecting portion 150 to balance the expansion and contraction of the adjacent inboard connecting portions 160 and vice versa. This balancing of thermal expansion and contraction by the alternating outboard and inboard connecting portions 150, 160 further inhibit the bending of the inboard and outboard braking portions 18, 20 which could propagate surface cracks. In this manner, the brake rotor 12 is more resistant to propagation of surface cracks on the brake rotor 12 including the mounting flange 40.

Still further, the even stiffness of the brake rotor 12 between the inboard and outboard surfaces 22, 24 thereof provides predominately radial deflection or expansion in response to heating of the brake rotor 12 during a braking operation. The radial expansion maintains even contact between the outboard surfaces 22, 24 and the brake pads which, in turn, maintains an even heat input into the brake rotor 12. The even heat input to the brake rotor 12 contributes to the radial expansion of the brake rotor 12 rather than axial deflection. In this manner, the even stiffness of the brake rotor 12 between the inboard and outboard surfaces 22, 24 provides a positive feedback loop of a high ratio of radial expansion to axial deflection.

As an example, the outboard connector portion 150 and outboard braking portion 20 may expand radially outward at a first rate (e.g., thousandths of an inch per degree Fahrenheit) due to heat generated by a first caliper pad and the outboard braking surface 24. The inboard connecting portion 160 and the inboard braking portion 18 may expand radially outward at a second rate due to heat generated by a second caliper pad and the inboard braking surface 22. The first and second rates may be substantially similar, such as within ten percent or less of each other, such as five percent or less. The outboard connecting portion 150 and outboard braking portion 20 may contract radially inward at a third rate once the first caliper pad is removed from the outboard braking surface 24. The inboard connecting portion 160 may contract radially inward at a fourth rate once the second caliper pad is removed from the inboard braking surface 22. The third and fourth rates may be substantially similar, such as within ten percent or less of each other, such as five percent or less.

Regarding FIGS. 7A and 7B, the brake rotor 12 includes at least one recess 170 (see FIG. 5) opposite the inboard vent inlets 72. In one embodiment, the recess 170 is annular and extends around the circumference of the mounting flange 40.

The inboard vent inlet 72 and recess 170 narrow the transition portion 42 such that the outboard connecting portion 150 has a thickness 174 that is less than half, such as less than a third, such as less than a quarter, of a thickness 175 of the brake rotor 12 measured between the inboard and outboard braking surfaces 22, 24.

Regarding FIG. 8B, the radial portion 162 of the inboard connecting portion 160 has a thickness 182 that may be greater than, less than, or equal to thickness 175 of the brake rotor 12 measured between the inboard and outboard braking surfaces 22, 24. The thickness 175 of the radial portion 162 including the height of the ABS tone ring mounting bosses 70 and the radius 103 (see FIG. 4) contribute to the stiffness of the connection between the inboard braking portion 18 and the mounting flange 40. In this manner, the outboard and inboard connecting portions 150, 160 may provide a robust connection between the mounting flange 40 and the inboard and outboard braking portions 18, 20 while resisting surface crack propagation in the brake rotor 12.

Figure 8C:
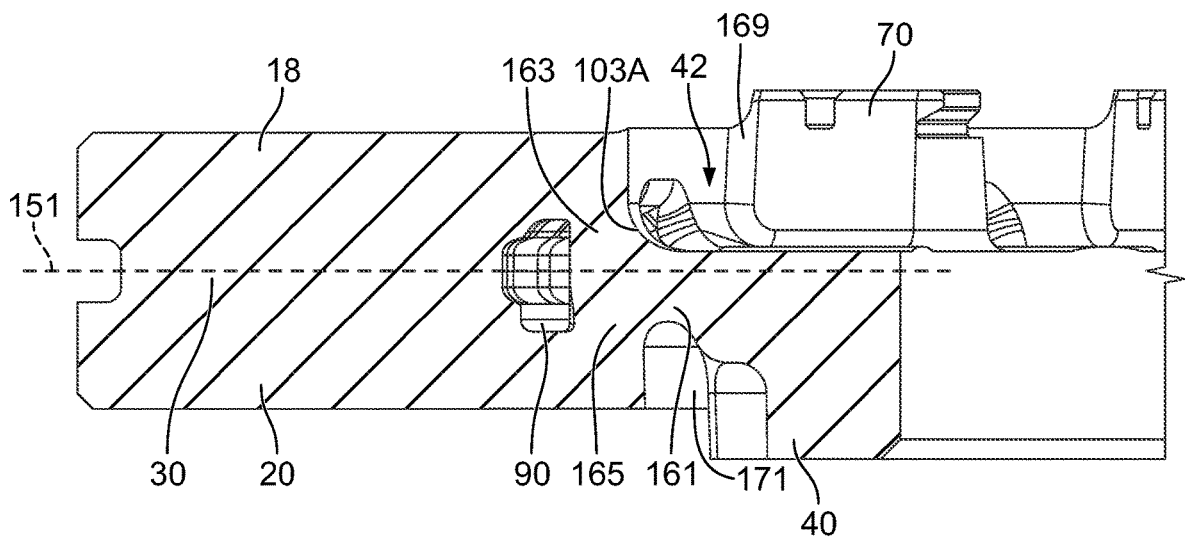
FIG. 8C is a cross-sectional view taken across line 8C-8C in FIG. 3 showing a radial connecting portion connecting the mounting flange to the inboard and outboard braking portions.
Figure 9:
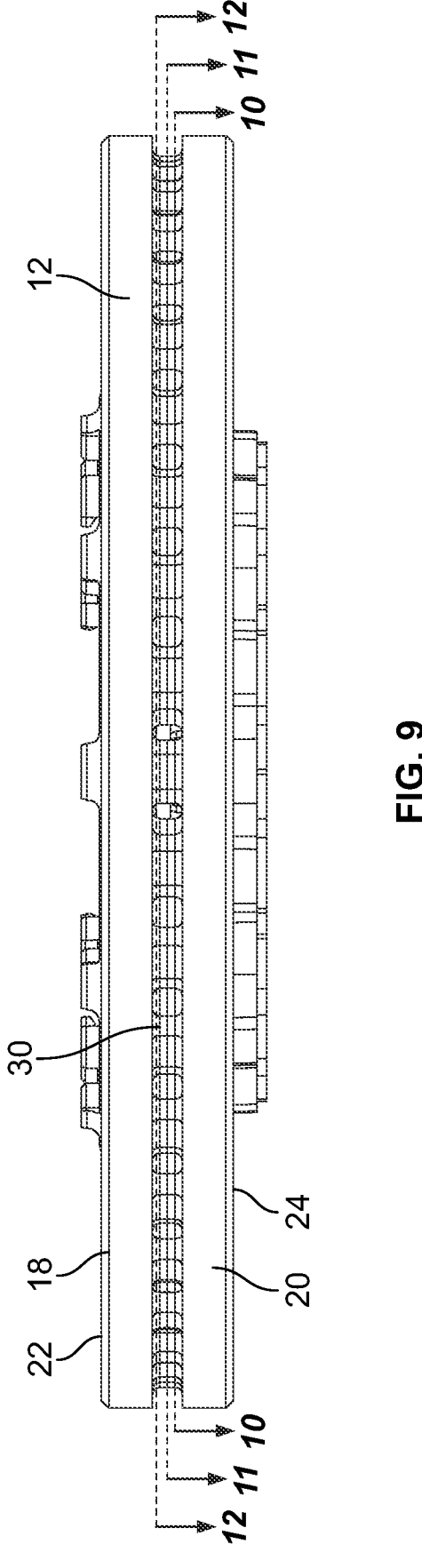
FIG. 9 is a side elevational view of the brake rotor of FIG. 2 showing the inboard and outboard braking portions of the brake rotor separated by vanes of the brake rotor.

Regarding FIG. 8C, the transition portion 42 of the brake rotor 12 includes a radial connecting portion 161 extending radially along the midline 151 of the brake rotor 12. The radial connecting portion 161 connects the mounting flange 40 to the inboard and outboard braking portions 18, 20. In one embodiment, the radial connecting portion 161 connects to axially inboard extending portion 163 and axially outboard extending portion 165 of the braking portion 17. The radial connecting portion 161 and axially inboard and outboard extending portions 163, 165 form a T shape that provides rigidity to the brake rotor 12 along the midline 151. The brake rotor 12 has an outboard recess 171 in communication with the outboard air inlets 120 and axially aligned with an inboard recess 169. The recesses 169, 171 narrow the brake rotor 12 so that the radial connecting portion 161 is recessed from the inboard and outboard braking surfaces 22, 24.

Further, the brake rotor 12 has radial connecting portions 161 on opposite sides of each inboard connecting portion 160 (see FIG. 8A, 8B) that cooperate with the inboard connecting portion 160 to provide rigidity to the inboard side of the brake rotor 12. As shown in FIG. 8C, the radius 103A transitions between the radial connecting portion 161 and the inboard axially extending portion 163. The larger the radius 103A, the more rigidity the radial connecting portions 161 provides.

Figure 11:
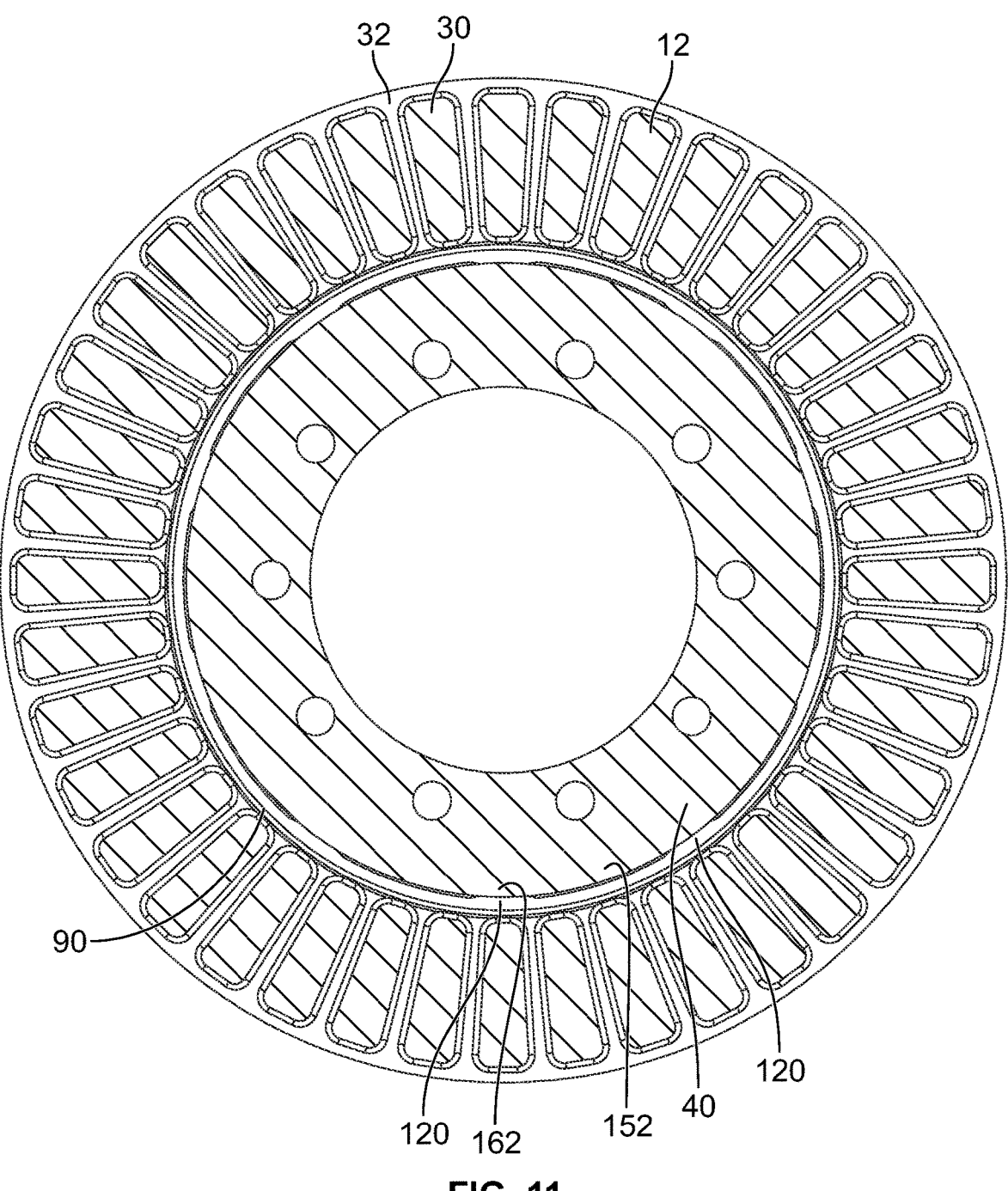
FIG. 11 is a cross-sectional view taken across line 11-11 in FIG. 9 showing an alternating arrangement of radial portions of the outboard and inboard connecting portions around the brake rotor.

Regarding FIGS. 10-12, the outboard air inlet 120A permits airflow to travel in an inboard direction into the brake rotor 12 and into the channel 90. Regarding FIG. 11, the radial portion 162 of the inboard connecting portion 160 extends radially over and narrows the outboard air inlet 120 at a position above the cross section of FIG. 10. The radial portion 152 of the outboard connecting portions 150 alternate with the radial portions 162 of the inboard connecting portions 160 around the brake rotor 12.

Regarding FIG. 12, the ABS tone ring mounting bosses 70 have base portions 200 with side portions 202, 204 that form at least a portion of the inboard air inlets 72. Regarding FIGS. 10 and 12, the airflow from both inboard and outboard sides 74, 75 of the brake rotor 12 via the inboard and outboard air inlets 72, 120 provides airflow through the brake rotor 12 and heat transfer between the brake rotor 12 and the air.

The brake rotor 12 may take a variety of forms. In one embodiment, the body 14 of the brake rotor 12 has a unitary, one-piece construction. The body 14 may include a metallic material such as cast iron, ceramic material, steel, and/or composite compacted graphite iron. In some other embodiments, the body 14 may be made of two or more components made of the same or different materials that are secured together such as by welding. Regarding FIGS. 9-12, the vanes 30 of the brake rotor are shown as being straight. The vanes 30 may have other configurations, such as curved.

The brake rotor 12 may be connected to the wheel hub 14 in a variety of approaches. In one embodiment, the mounting flange 40 may be connected to the wheel hub 14 using spring pins rather than studs and nuts.

Figure 13:
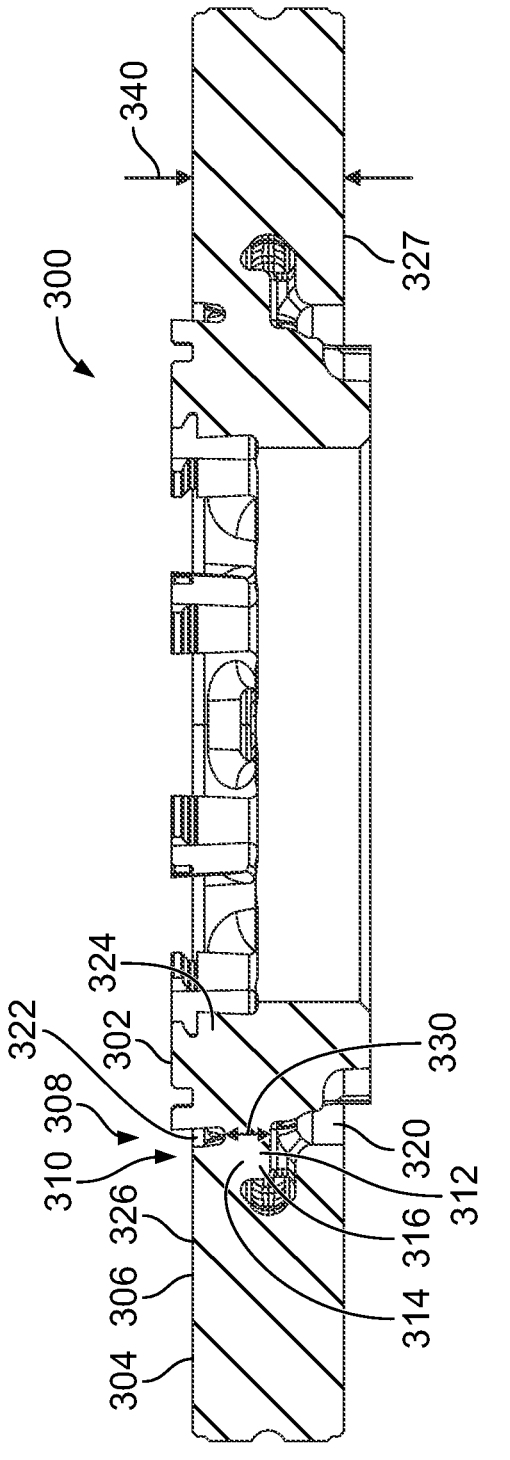
FIG. 13 is a cross-sectional view of another brake rotor showing recesses on an inboard side of the brake rotor opposite outboard air inlets of the brake rotor.

Regarding FIG. 13, a cross-section of another brake rotor 300 is provided. The brake rotor 300 is similar to the brake rotor 12 and includes a mounting flange 302, a braking portion 304 having an inboard braking portion 306, and a transition portion 308. The transition portion 308 includes an inboard connecting portion 310 connecting the mounting flange 302 to the inboard braking portion 306. The inboard connecting portion 310 includes a radial portion 312, a transverse portion 314, and an elbow portion 316 connecting the radial and transverse portions 312, 314. The brake rotor 300 includes outboard air inlets 320 and at least one recess 322 opposite the outboard air inlets 320. The recess 322 may be formed between each ABS tone ring mounting boss 324 and an inboard braking surface 326 of the brake rotor 300. The outboard air inlet 320 and recess 322 operate to narrow the transition portion 308 so that the inboard connecting portion 310 has a thickness 330 that is less than half, such as less than a third, such as less than a quarter, of a thickness 340 between the inboard braking surface 326 and an outboard braking surface 327.

Figure 14:
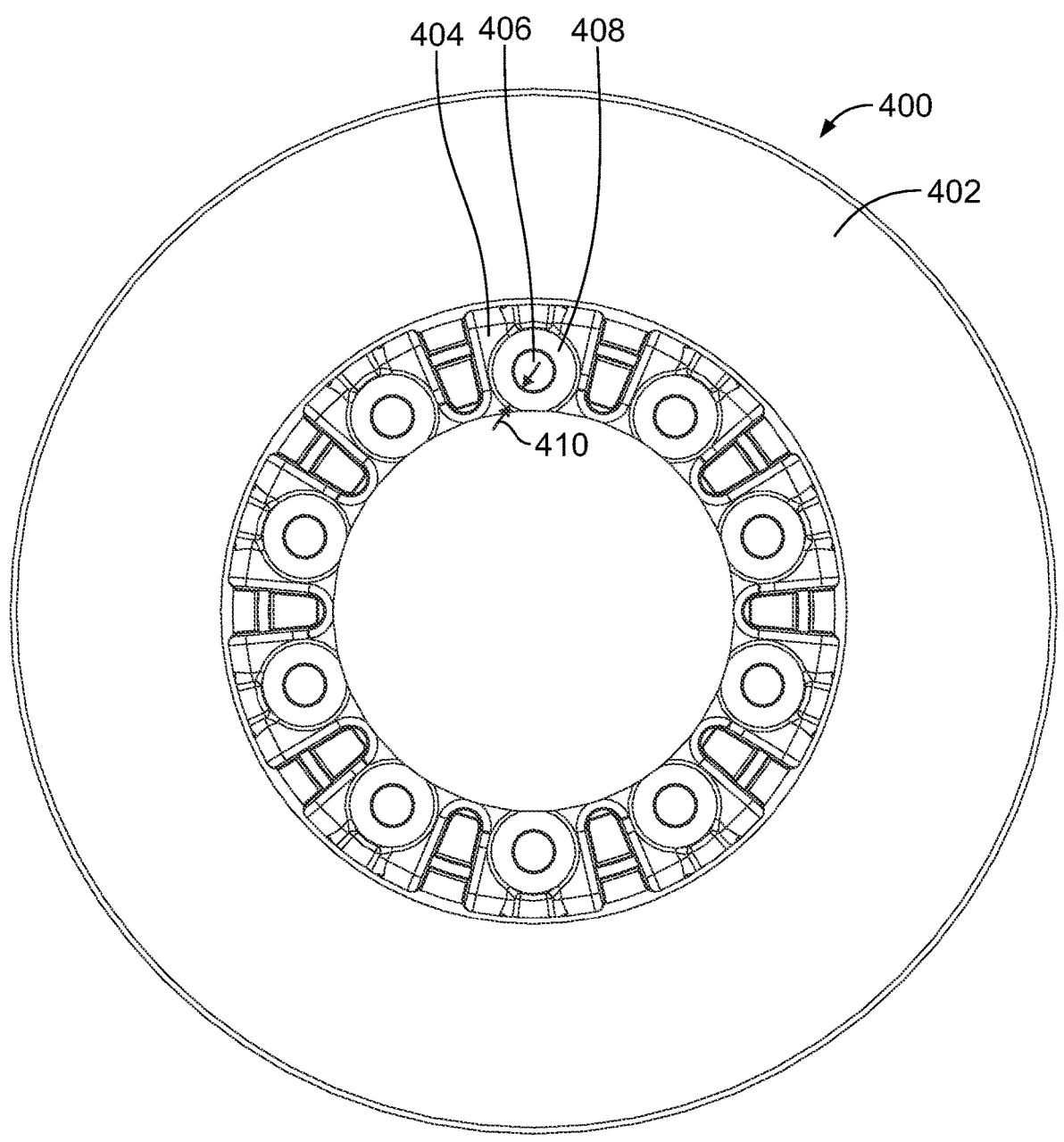
FIG. 14 is a plan view of an inboard side of another brake rotor showing nut seats of the mounting flange of the brake rotor having an alternating arrangement with ABS tone ring mounting bosses of the mounting flange.

Regarding FIG. 14, a brake rotor 400 is provided that is similar in many respects to the brake rotor 12 discussed above. The brake rotor 400 includes a braking portion 402 and a mounting flange 404. The mounting flange 404 includes through openings 406 for receiving studs of a wheel hub and nut seats 408 extending about the through openings 406. The nut seats 408 have a radial thickness 410 that is larger than a corresponding radial thickness of the nut seats 97 (see FIG. 4) of the brake rotor 12. The larger radial thickness 410 may provide a larger nut seating area and compensate for variation in seated nut location that may occur due to variation in manufacturing and/or assembly.

Figure 15:
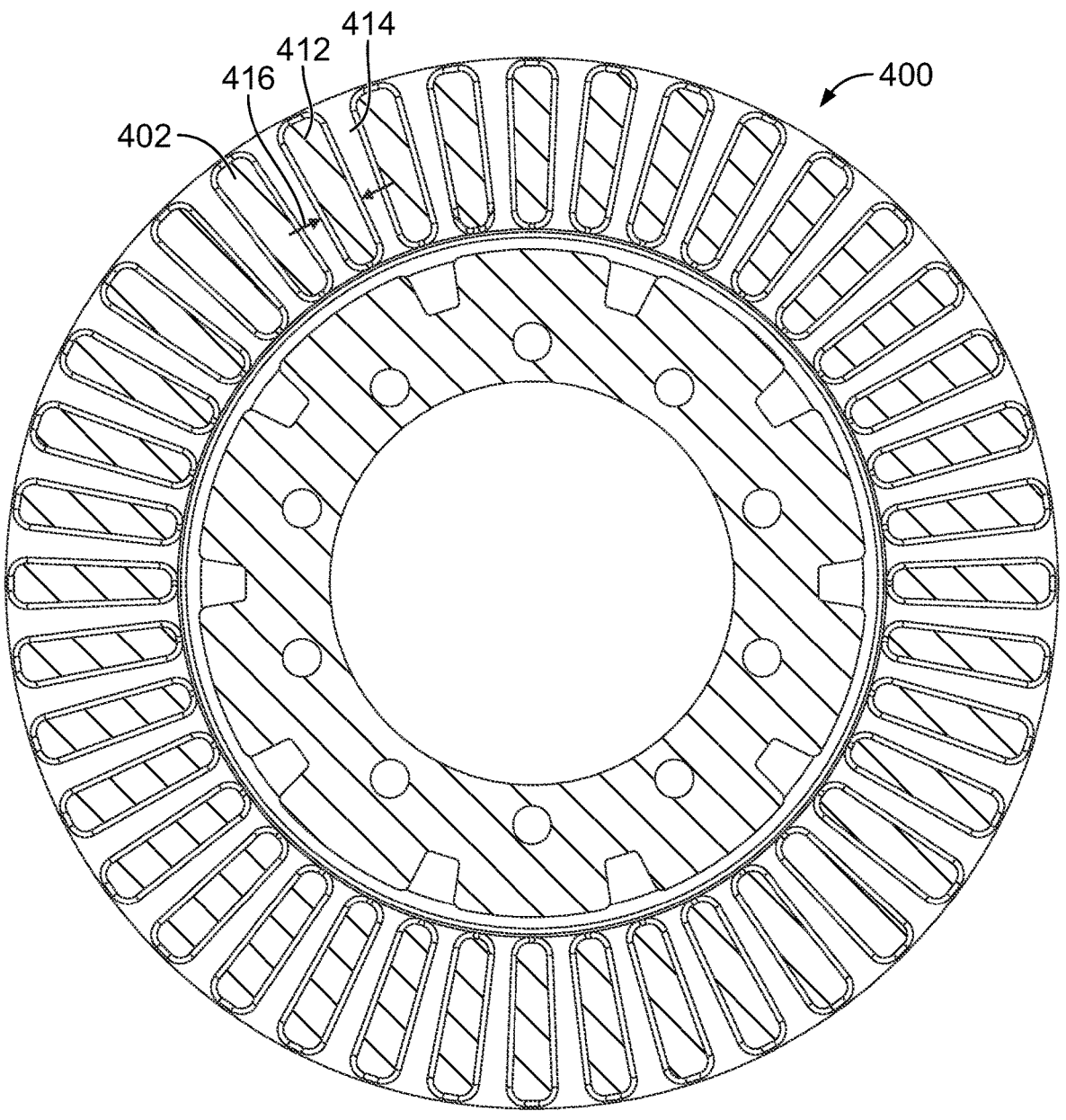
FIG. 15 is a cross-sectional view of the brake rotor of FIG. 14 showing internal vanes of the brake rotor.

Regarding FIG. 15, the braking portion 402 of the brake rotor 400 includes vanes 412 and vents 414. The vanes 412 may have a width 416 that is less than a corresponding width of the vanes 30 (see FIG. 10) of the brake rotor 12. The narrower vanes 412 provide wider vents 414 which may be easier to manufacture in some applications.

Figure 16:
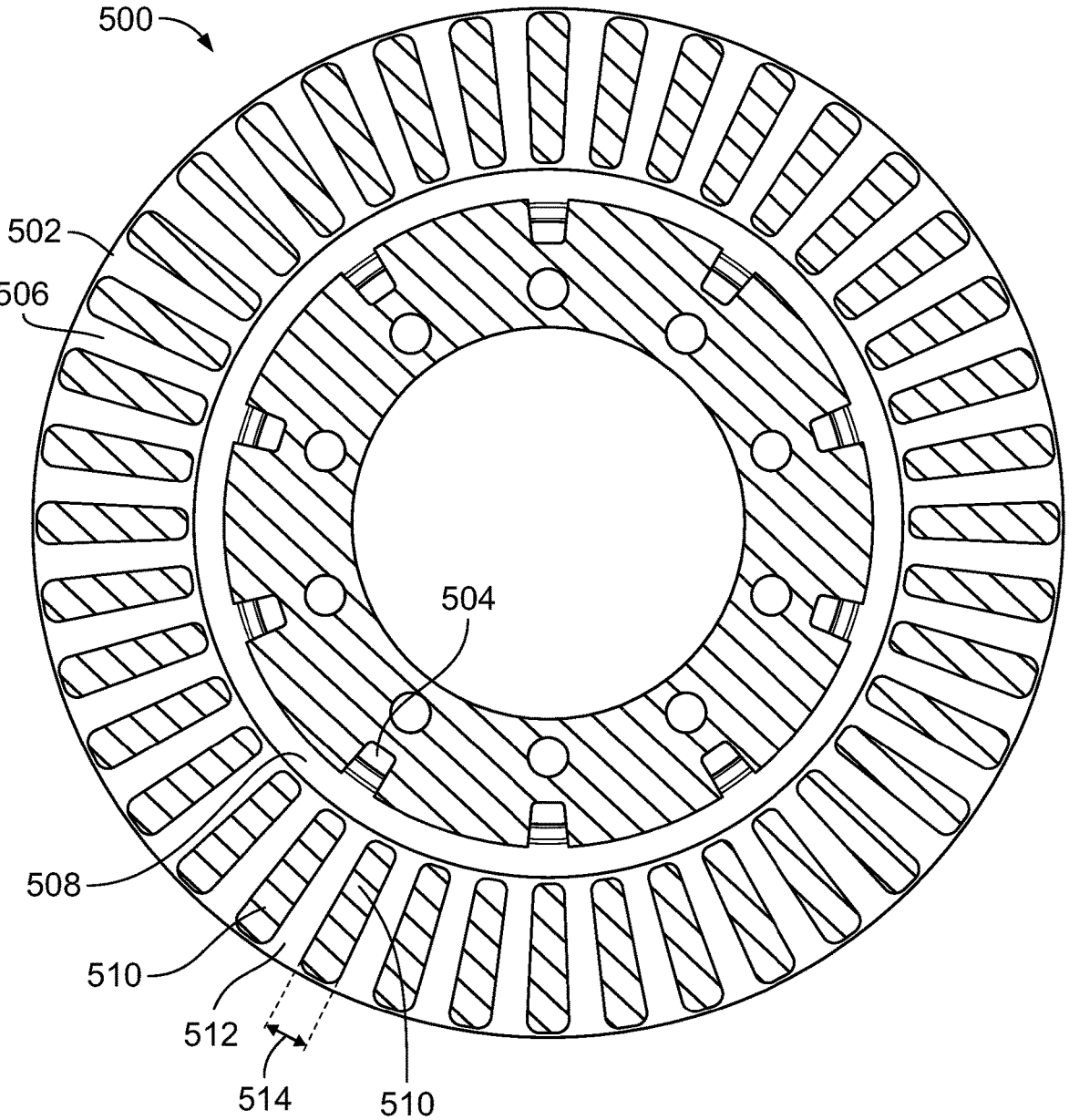
FIG. 16 is a cross-sectional view of another brake rotor showing narrowed internal vanes of the brake rotor.

Regarding FIG. 16, a brake rotor 500 is provided that is similar in many respects to the brake rotors discussed above such that differences will be highlighted. The brake rotor 500 includes a body 502 having outboard air inlets 504, a braking portion 506, and an annular channel 508. The braking portion 506 includes vanes 510 that are separated by vents 512. The vanes 510 have a width 514 that is narrower than a corresponding width of the vanes 30 discussed above (see FIG. 10) which makes the vents 512 wider than vents 32. The wider vents 512 may facilitate manufacturing in some applications.

Figure 17:
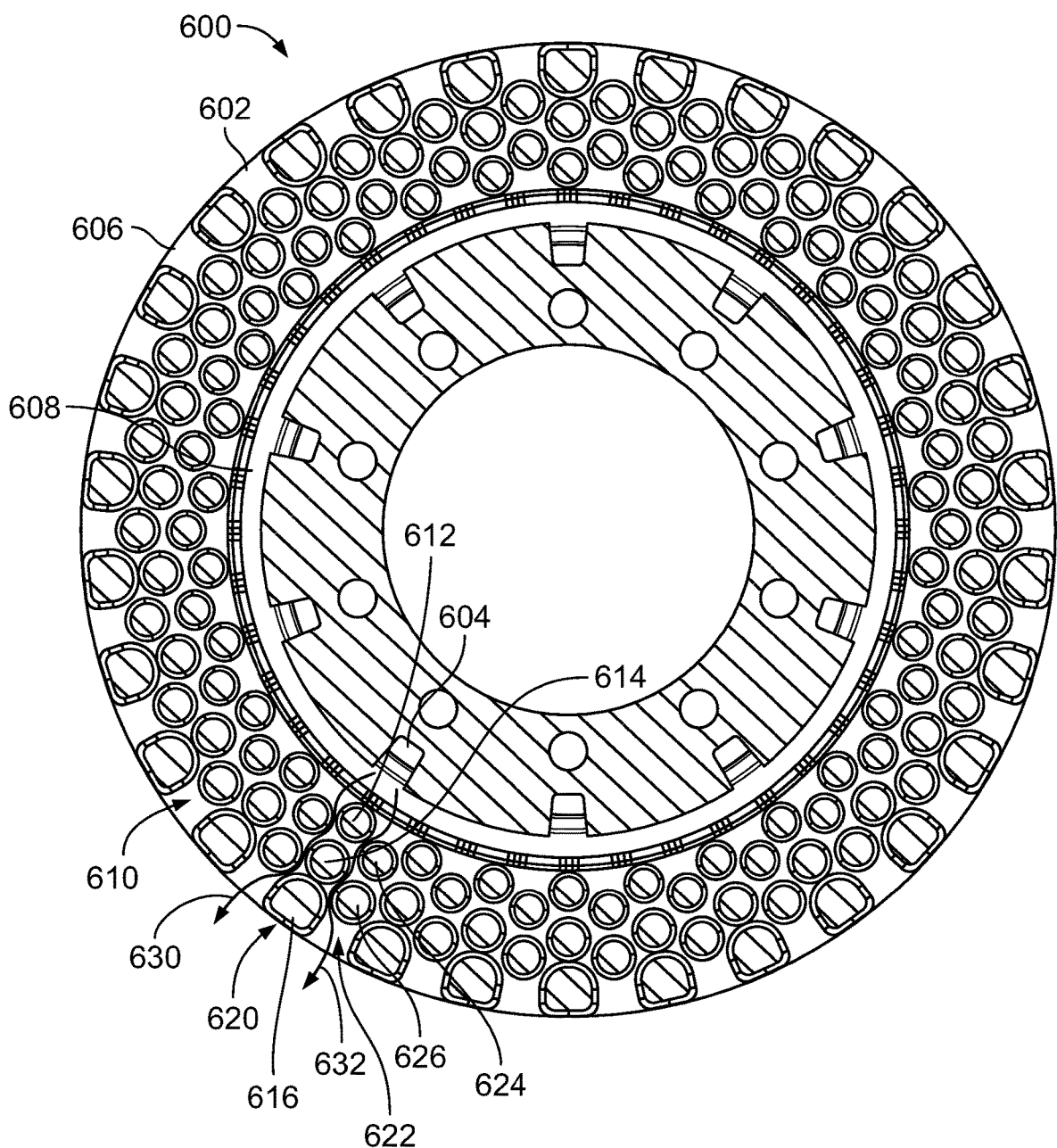
FIG. 17 is a cross-sectional view of another brake rotor showing internal pin vanes of the brake rotor.

Regarding FIG. 17, a brake rotor 600 is shown that is similar in many respects to the brake rotors discussed above such that differences will be highlighted. The brake rotor 600 includes a body 602 having outboard air inlets 604, a braking portion 606, and an annular channel 608. The braking portion 606 includes pin vanes 610 that may have varying sizes about the brake rotor 600. In one embodiment, the pin vanes 610 include inner pin vanes 612, intermediate pin vanes 614, and outer pin vanes 616. Groupings of the pin vanes 612, 614, 616 may be aligned radially such as a first grouping 620 of pin vanes 610. The pin vanes 610 may include a second grouping 622 of radially aligned pin vanes 610 such as pin vanes 624, 626. The pin vanes 624, 626 are circumferentially offset from the pin vanes 612, 614, 620 so that the pin vanes 624, 626 may nest closely with the pin vanes 612, 614, 616. In one embodiment, the brake rotor 600 includes an alternating arrangement of pin vane groupings 620, 622 around the braking portion 606. The air flow that enters the brake rotor 600 via the outboard air inlets 604 and inboard air inlets may travel along paths 630, 632 around the pin vanes 610 before exiting the brake rotor 600. The nested pin vanes 610 may provide a large volume of brake rotor material between the inboard and outboard cheeks of the brake rotor 600 while providing a path for air to flow through the braking portions and cool the undersides of the cheeks. The pin vanes 610 between the cheeks of the brake rotor 600 resist crack propagation in the braking portion 606. The pin vanes 610 may also induce turbulence in airflow within the brake rotor 600 to improve heat transfer. In some applications, the pin vanes 610 may also be resistant to diminished cooling due to corrosion or debris clogging the vents because of the many pin vanes 610 and pathways through the pin vanes 610.

Figure 18:
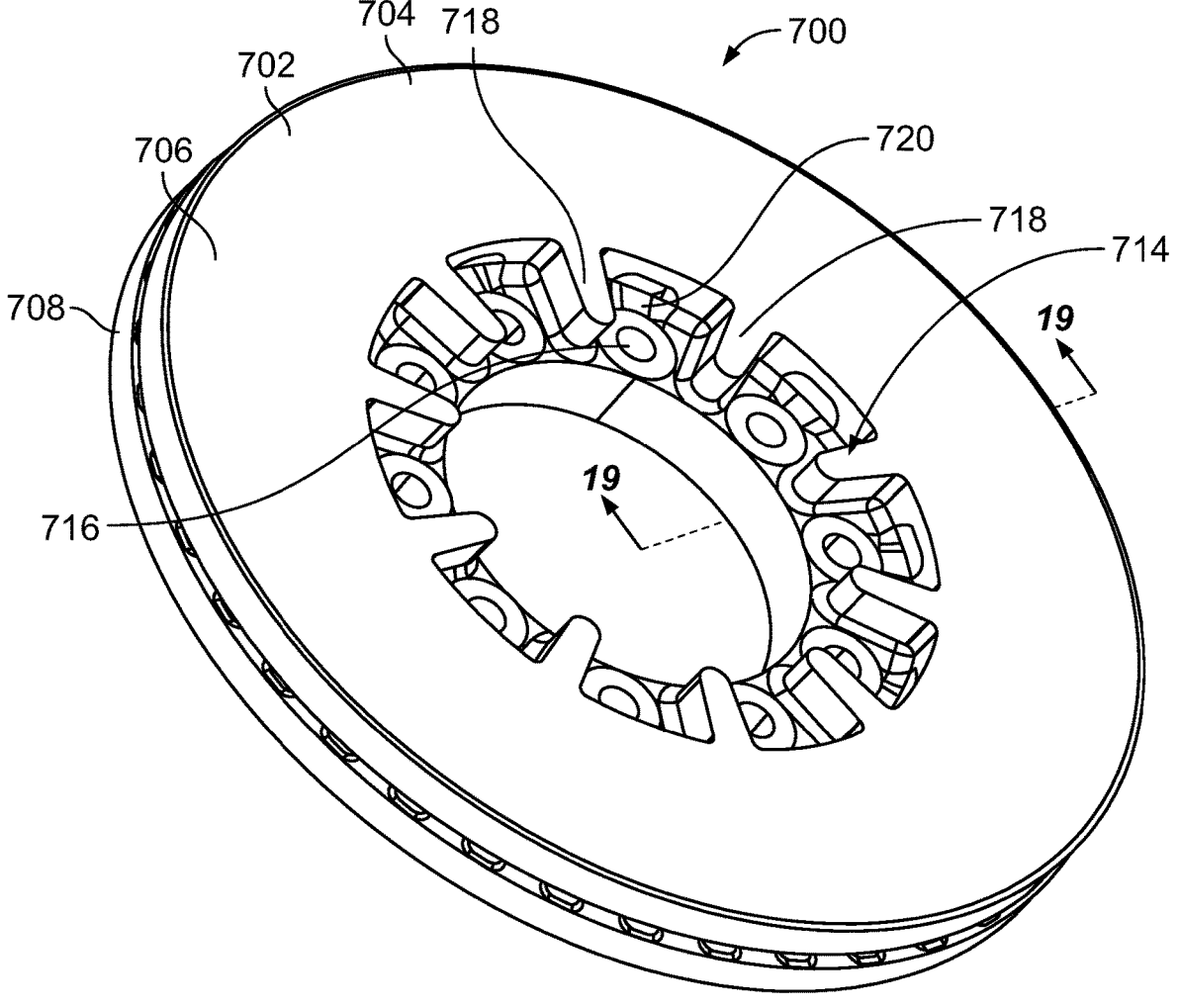
FIG. 18 is a perspective view of another brake rotor showing bosses alternating with through openings about a mounting flange of the brake rotor.

Regarding FIG. 18, a brake rotor 700 is provided that is similar to the brake rotors discussed above such that differences will be highlighted. The brake rotor 700 includes a body 702 having a braking portion 704 with an inboard braking portion 706 and an outboard braking portion 708. The braking portion 704 includes pin vanes 710 (see FIG. 19). The body 702 further includes a mounting flange 714 having through openings 716 to receive studs of a wheel hub and bosses 718 alternating with the through opening 716 about the mounting flange 714. The brake rotor 700 includes inboard air inlets 720 intermediate the bosses 718 about the brake rotor 700.

Figure 19:
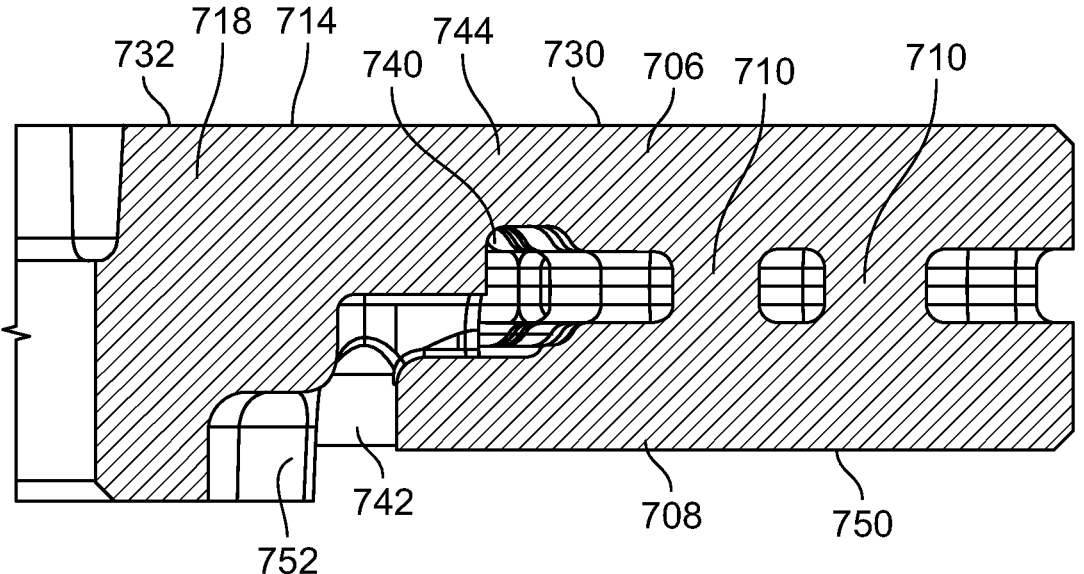
FIG. 19 is a cross-sectional view taken across line 19-19 in FIG. 18 showing an inboard connecting portion of the brake rotor that connects the mounting flange to an inboard braking surface of the brake rotor.

Regarding FIG. 19, the inboard braking portion 706 includes an inboard braking surface 730 that may be coplanar and contiguous with an upper surface 732 of the boss 718. In one embodiment, the surfaces 730, 732 are portions of a single flat surface. The body 702 includes a channel 740 that is in communication with the inboard air inlets 720 and the outboard air inlets 742. The body 702 includes inboard connector portions 744 connecting the mounting flange 714 to the inboard braking surface 730. Further, the body 702 includes an outboard braking surface 750 of the outboard braking portion 708 that may be spaced from a portion 752 of the mounting flange 714 by the outboard air inlet 742.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

11

What is claimed is:

1. A commercial vehicle brake rotor comprising:

a unitary, one-piece annular body having a central axis of rotation;

vents of the annular body;

a braking portion of the annular body having an inboard braking surface and an outboard braking surface;

a central mounting flange of the annular body;

through openings of the central mounting flange to receive studs of a wheel hub, the through openings each having at least portion thereof extending axially intermediate the inboard and outboard braking surfaces of the annular body;

inboard air inlets of the annular body in communication with the vents;

outboard air inlets of the annular body in communication with the vents;

outboard connecting portions of the annular body connecting the outboard braking surface to the central mounting flange and defining at least a portion of the inboard air inlets, the outboard connecting portions each extending outboard from the central mounting flange toward the outboard braking surface; and inboard connecting portions of the annular body connecting the inboard braking surface to the central mounting flange and defining at least a portion of the outboard air inlets, the inboard connecting portions each extending inboard from the central mounting flange toward the inboard braking surface; and wherein the inboard and outboard connecting portions alternate about the annular body.

2. The commercial vehicle brake rotor of claim 1 wherein the braking portion includes vanes; and wherein the inboard and outboard connecting portions are each radially aligned with one or more of the vanes of the annular body and extend from the central mounting flange toward the one or more vanes.

3. The commercial vehicle brake rotor of claim 2 wherein the annular body includes a channel connecting the inboard and outboard air inlets and the vents; and wherein the channel is radially intermediate the vanes and the inboard and outboard connecting portions.

4. A commercial vehicle brake rotor comprising:

a unitary, one-piece annular body having a central axis of rotation;

vents of the annular body;

a braking portion of the annular body having an inboard braking surface and an outboard braking surface;

a central mounting flange of the annular body;

through openings of the central mounting flange to receive studs of a wheel hub, the through openings each having at least portion thereof extending axially intermediate the inboard and outboard braking surfaces of the annular body;

inboard air inlets of the annular body in communication with the vents;

outboard air inlets of the annular body in communication with the vents;

outboard connecting portions of the annular body connecting the outboard braking surface to the central mounting flange and defining at least a portion of the inboard air inlets, the outboard connecting portions each extending outboard from the central mounting flange toward the outboard braking surface; and inboard connecting portions of the annular body connecting the inboard braking surface to the central mounting flange and defining at least a portion of the outboard air inlets, the inboard connecting portions each extending inboard from the central mounting flange toward the inboard braking surface;

wherein the braking portion comprises an inboard braking portion including the inboard braking surface and an outboard braking portion including the outboard braking surface, the vents axially intermediate the inboard and outboard braking portions;

wherein the inboard connecting portions include first portions extending outboard from the inboard braking portion and the outboard connecting portions include second portions extending inboard from the outboard braking portion; and wherein the inboard and outboard connecting portions include radial connecting portions connecting the central mounting flange to the first and second portions of the inboard and outboard connecting portions.

5. The commercial vehicle brake rotor of claim 1 wherein the annular body includes at least one outboard recess axially aligned with ones of the inboard and outboard connecting portions so that the ones of the inboard and outboard connecting portions are recessed from the outboard braking surface.

6. The commercial vehicle brake rotor of claim 1 wherein the outboard connecting portions are axially aligned with the inboard air inlets.

7. The commercial vehicle brake rotor of claim 1 wherein the inboard connecting portions are axially aligned with the outboard air inlets.

8. The commercial vehicle brake rotor of claim 1 wherein at least one of the inboard and outboard connecting portions has a first portion extending radially outward from the central mounting flange and a second portion radially outward from the first portion extending transverse to the first portion.

9. The commercial vehicle brake rotor of claim 8 wherein the at least one of the inboard and outboard connecting portions includes an elbow portion connecting the first and second portions.

10. The commercial vehicle brake rotor of claim 1 wherein the through openings of the central mounting flange are radially aligned with one of the outboard air inlets or one of the inboard air inlets; and wherein the annular body includes a plurality of step surfaces intermediate the through openings and the one of the outboard air inlets or the one of the inboard air inlets.

11. The commercial vehicle brake rotor of claim 1 wherein the annular body includes a channel connecting the inboard and outboard air inlets and the vents.

12. The commercial vehicle brake rotor of claim 1 wherein the inboard and outboard air inlets open to the central mounting flange.

13. A commercial vehicle brake rotor comprising:

an annular body having an outboard side to be positioned adjacent a wheel hub and an inboard side opposite the outboard side;

a central mounting portion of the annular body for connecting the annular body to the wheel hub, the central mounting portion having through openings to receive studs of the wheel hub;

a braking portion of the annular body radially outward of the central mounting portion, the braking portion having an inboard braking surface and an outboard braking surface;

vents of the braking portion;

outboard air inlets of the annular body radially inward of the vents, the outboard air inlets opening to the outboard side of the annular body at the central mounting portion and in communication with the vents;

inboard bosses of the central mounting portion alternating with the through openings about the central mounting portion;

inboard air inlets of the annular body radially inward of the vents, the inboard air inlets alternating with the inboard bosses about the annular body, the inboard air inlets opening to the inboard side of the annular body at the central mounting portion and in communication with the vents; and wherein the annular body is rotatable about an axis and the inboard bosses are axially aligned with the outboard air inlets.

14. The commercial vehicle brake rotor of claim 13 wherein the inboard bosses include ABS tone ring mounting bosses.

15. The commercial vehicle brake rotor of claim 13 wherein the openings of the central mounting portion are radially aligned with the inboard air inlets or the outboard air inlets.

16. A commercial vehicle brake rotor comprising:

an annular body;

a central mounting portion of the annular body;

a braking portion of the annular body radially outward of the central mounting portion, the braking portion having an inboard braking surface and an outboard braking surface;

vents of the braking portion;

outboard air inlets of the annular body opening to the central mounting portion and in communication with the vents;

inboard bosses of the mounting portion;

inboard air inlets of the annular body alternating with the inboard bosses about the annular body, the inboard air inlets opening to the central mounting portion and in communication with the vents;

wherein the central mounting portion includes through openings to receive studs;

wherein the through openings are radially aligned with the inboard air inlets; and wherein the inboard air inlets each include an opening and a groove intermediate the opening and one of the through openings of the mounting portion.

17. A commercial vehicle brake rotor comprising:

an annular body having an outboard side and an inboard side, the annular body being rotatable around a central axis;

a central mounting portion of the annular body, the central mounting portion having through openings to receive studs of a wheel hub;

a braking portion of the annular body radially outward of the central mounting portion, the braking portion having an inboard braking surface and an outboard braking surface;

vents of the braking portion;

outboard air inlets of the annular body radially inward of the vents, the outboard air inlets opening to the central mounting portion and in communication with the vents;

inboard bosses of the central mounting portion;

inboard air inlets of the annular body radially inward of the vents, the inboard air inlets alternating with the inboard bosses about the annular body, the inboard air inlets opening to the central mounting portion and in communication with the vents;

wherein the central mounting portion includes radial inboard surface portions of the inboard side of the annular body and at least one outboard surface portion of the outboard side of the annular body;

the braking portion includes axial inboard arcuate sidewall portions of the inboard side of the annular body extending between the inboard bosses about the annular body;

the annular body includes radius portions connecting the radial inboard surface portions to the axial arcuate sidewall portions;

wherein the outboard air inlets open to the at least one outboard surface portion of the central mounting portion; and wherein the inboard bosses extend radially inward from the axial inboard arcuate sidewall portions.

18. The commercial vehicle brake rotor of claim 17 wherein the radius portions include a pair of radius portions on opposite sides of each of the inboard air inlets.

19. The commercial vehicle brake rotor of claim 13 wherein the central mounting portion of the annular body includes:

nut seating surfaces extending about the through openings; and step surfaces radially outward of the nut seating surfaces.

20. The commercial vehicle brake rotor of claim 13 wherein the inboard and outboard air inlets alternate about the annular body.

21. The commercial vehicle brake rotor of claim 13 wherein the annular body has a unitary, one-piece construction.

22. The commercial vehicle brake rotor of claim 13 wherein the annular body includes an internal channel connecting the inboard and outboard air inlets and the vents.

23. A commercial vehicle wheel end assembly comprising:

a wheel hub;

a plurality of studs of the wheel hub;

a brake rotor rotatable with the wheel hub about an axis, the brake rotor having an outboard side and an inboard side;

inboard and outboard braking surfaces of the brake rotor;

a central mounting portion of the brake rotor having a plurality of through openings to receive the studs of the wheel hub;

at least a portion of each of the through openings extending axially intermediate the inboard and outboard braking surfaces of the brake rotor;

vents of the brake rotor;

inboard air inlets of the brake rotor opening to the inboard side of the brake rotor, the inboard air inlets in communication with the vents;

outboard air inlets of the brake rotor opening to the outboard side of the brake rotor, the outboard air inlets in communication with the vents;

wherein the brake rotor includes outboard connecting portions connecting the outboard braking surface to the central mounting portion;

wherein the brake rotor includes inboard connecting portions connecting the inboard braking surface to the central mounting portion;

wherein the inboard air inlets are axially aligned with the outboard connecting portions;

wherein the outboard air inlets are axially aligned with the inboard connecting portions;

wherein the outboard connecting portions define at least a portion of the inboard air inlets; and wherein the inboard connecting portions define at least a portion of the outboard air inlets.

24. The commercial vehicle wheel end assembly of claim 23 wherein the brake rotor has a unitary, one-piece construction.

25. The commercial vehicle wheel end assembly of claim 23 wherein the central mounting portion has an outboard surface and an inboard surface opposite the outboard surface, the through openings extending between the outboard surface and the inboard surface;

wherein at least one of the inboard and outboard surfaces of the central mounting portion of the brake rotor is axially intermediate the inboard and outboard braking surfaces.

26. The commercial vehicle wheel end assembly of claim 23 wherein the brake rotor includes inboard bosses axially aligned with the outboard air inlets.

27. The commercial vehicle wheel end assembly of claim 23 wherein the inboard and outboard air inlets alternate about the brake rotor.

28. The commercial vehicle wheel end assembly of claim 23 further comprising an insulator configured to be sandwiched between the central mounting portion of the brake rotor and the wheel hub.

29. The commercial vehicle wheel end assembly of claim 23 wherein the central mounting portion includes inboard bosses axially aligned with the outboard air inlets; and wherein the through openings of the central mounting portion are radially aligned with the inboard air inlets.

30. The commercial vehicle wheel end assembly of claim 23 wherein the inboard and outboard air inlets include inlet openings adjacent the mounting portion of the brake rotor.

31. The commercial vehicle brake rotor of claim 16 wherein the groove is a radial groove.

32. The commercial vehicle brake rotor of claim 16 wherein the central mounting portion includes a nut seat extending about each of the through openings; and wherein the central mounting portion includes steps that transition from the nut seats to floor surfaces of the grooves.

33. A commercial vehicle brake rotor comprising:

an annular body having a central axis of rotation, the annular body having an inboard side and an outboard side opposite the inboard side;

inboard and outboard braking surfaces of the annular body;

a central mounting portion of the annular body having a plurality of through openings to receive studs of a wheel hub;

at least a portion of each of the through openings extending axially intermediate the inboard and outboard braking surfaces of the annular body;

vents of the annular body;

inboard air inlets of the annular body opening to the inboard side of the annular body, the inboard air inlets in communication with the vents;

outboard air inlets of the annular body opening to the outboard side of the annular body, the outboard air inlets in communication with the vents;

wherein the brake rotor includes outboard connecting portions connecting the outboard braking surface to the central mounting portion;

wherein the brake rotor includes inboard connecting portions connecting the inboard braking surface to the central mounting portion;

wherein the inboard air inlets are axially aligned with the outboard connecting portions;

wherein the outboard air inlets are axially aligned with the inboard connecting portions;

wherein the outboard connecting portions define at least a portion of the inboard air inlets; and wherein the inboard connecting portions define at least a portion of the outboard air inlets.

34. The commercial vehicle brake rotor of claim 33 wherein the annular body has a unitary, one-piece construction.

35. The commercial vehicle brake rotor of claim 33 wherein the central mounting portion has an outboard surface and an inboard surface opposite the outboard surface, the through openings extending between the outboard surface and the inboard surface;

wherein at least one of the inboard and outboard surfaces of the central mounting portion of the brake rotor is axially intermediate the inboard and outboard braking surfaces.

36. The commercial vehicle brake rotor of claim 33 wherein the central mounting portion includes inboard bosses.

37. The commercial vehicle brake rotor of claim 36 wherein the inboard bosses are configured to receive an ABS tone ring.

38. The commercial vehicle brake rotor of claim 33 wherein the central mounting portion includes inboard bosses axially aligned with the outboard air inlets.

39. The commercial vehicle brake rotor of claim 33 wherein the central mounting portion includes inboard bosses axially aligned with the outboard air inlets; and wherein the through openings of the central mounting portion are radially aligned with the inboard air inlets.

40. The commercial vehicle brake rotor of claim 1 wherein the annular body includes intermediate connecting portions connecting the outboard and inboard braking surfaces to the central mounting flange, the intermediate connecting portions each comprising a radial connecting portion and inboard and outboard portions extending axially from the radial connecting portion; and wherein the intermediate connecting portions are intermediate the inboard and outboard connecting portions about the annular body.

41. The commercial vehicle brake rotor of claim 1 wherein the annular body includes pin vanes defining at least a portion of the vents.

42. The commercial vehicle brake rotor of claim 33 wherein the annular body includes pin vanes defining at least a portion of the vents.

* * * * *